United States Patent
Sabry et al.

(10) Patent No.: US 10,060,791 B2
(45) Date of Patent: Aug. 28, 2018

(54) INTEGRATED SPECTRAL UNIT

(71) Applicant: Si-Ware Systems, Cairo (EG)

(72) Inventors: Yasser M. Sabry, Cairo (EG); Diaa Abdel Maged Khalil, Cairo (EG); Mostafa Medhat, Cairo (EG); Hisham Haddara, Cairo (EG); Bassam Saadany, Cairo (EG); Khaled Hassan, Cairo (EG)

(73) Assignee: Si-Ware Systems, Cairo (EG)

( * ) Notice: Subject to any disclaimer, the term of this patent is extended or adjusted under 35 U.S.C. 154(b) by 0 days.

(21) Appl. No.: 15/623,961

(22) Filed: Jun. 15, 2017

(65) Prior Publication Data

US 2017/0363469 A1    Dec. 21, 2017

Related U.S. Application Data

(60) Provisional application No. 62/350,486, filed on Jun. 15, 2016.

(51) Int. Cl.
    *G01J 3/45*          (2006.01)
    *G01J 3/02*          (2006.01)

(52) U.S. Cl.
    CPC .......... *G01J 3/0208* (2013.01); *G01J 3/0229* (2013.01); *G01J 3/0291* (2013.01); *G01J 3/45* (2013.01)

(58) Field of Classification Search
    CPC ... G01B 9/02049; G01B 9/02051; G01J 3/45; G01J 3/0208; G01J 3/021; G01J 3/0291
    See application file for complete search history.

(56) References Cited

U.S. PATENT DOCUMENTS

| | | | |
|---|---|---|---|
| 8,045,159 B2 | 10/2011 | Egloff et al. | |
| 8,335,031 B2 | 12/2012 | Warashina et al. | |
| 8,531,675 B2 | 9/2013 | Khalil et al. | |
| 2006/0193356 A1 | 8/2006 | Osiander et al. | |
| 2010/0188728 A1* | 7/2010 | Warashina | B81B 7/0067 359/290 |
| 2011/0139990 A1 | 6/2011 | Xie et al. | |

(Continued)

FOREIGN PATENT DOCUMENTS

| | | |
|---|---|---|
| EP | 3032662 A1 | 6/2016 |
| WO | 2015/019739 A1 | 2/2015 |

OTHER PUBLICATIONS

Hamamatsu Photonics. "MEMS devices: Technology | Hamamatsu Photonics." http://www.hamamatsu.com/us/en/community/optical_sensors/technology/mems_devices. (Downloaded Aug. 6, 2017).

(Continued)

*Primary Examiner* — Jonathan Hansen
(74) *Attorney, Agent, or Firm* — Loza & Loza, LLP; Holly Rudnick

(57) ABSTRACT

Aspects of the disclosure relate to an integrated spectral unit including a micro-electro-mechanical systems (MEMS) interferometer fabricated within a first substrate and a light redirecting structure integrated on a second substrate, where the second substrate is coupled to the first substrate. The light redirecting structure includes at least one mirror for receiving an input light beam propagating in an out-of-plane direction with respect to the first substrate and redirecting the input light beam to an in-plane direction with respect to the first substrate towards the MEMS interferometer.

36 Claims, 27 Drawing Sheets

(56) References Cited

U.S. PATENT DOCUMENTS

| | | |
|---|---|---|
| 2014/0098371 A1 | 4/2014 | Sabry et al. |
| 2014/0139924 A1* | 5/2014 | Warashina ........... G02B 26/001 359/578 |
| 2016/0202037 A1* | 7/2016 | Suzuki ................. G01J 3/0256 216/2 |

OTHER PUBLICATIONS

Eltagoury et al., "Novel fourier transform infrared spectrometer architecture based on cascaded Fabry-Perot interferometers." SPIE OPTO, pp. 97600L-97600L (2016).

Warashina et al., "MEMS based miniature FT-IR engine with built-in photodetector." SPIE MOEMS-MEMS, pp. 89770E-89770E (2014).

International Search Report & Written Opinion for PCT/US17/37684 dated Nov. 13, 2017; 9 pages.

* cited by examiner

INTEGRATED SPECTRAL UNIT

PRIORITY CLAIM

This application claims priority to and the benefit of Provisional Application No. 62/350,486, filed in the U.S. Patent and Trademark Office on Jun. 15, 2016, the entire content of which is incorporated herein by reference as if fully set forth below in its entirety and for all applicable purposes.

TECHNICAL FIELD

The technology discussed below relates generally to integrated interferometric devices for interference measurements and spectral analysis, and in particular to integrated Micro-Electro-Mechanical Systems (MEMS)-based interferometric devices.

BACKGROUND

Compact optical sensors including miniaturized interferometers and integrated detectors are utilized in many applications involving spectroscopy and coherence imaging. For example, compact optical sensors may be employed in fluidic spectroscopic sensing applications, including gases, diffuse reflection spectroscopy measurement and biomedical imaging. Such compact optical sensors are often implemented into portable devices and found in confined environments A traditional compact spectrometer working in the 340-780 nm wavelength range utilizes a complementary metal-oxide-semiconductor (CMOS) image sensor chip and a glass wiring board with a convex lens and reflective diffraction grating. Deep etching technology is used to form an entrance slit on the CMOS image sensor chip and nanoimprinting technology is used to form the reflective diffraction grating. Light is guided into the slit, and then diffracted by the grating. The separated wavelengths impinge on the CMOS image sensor. Each pixel in the sensor receives a particular wavelength of light. However, extending this spectrometer to the infrared (IR) may be cost-prohibitive due to the need to incorporate an array of sensors.

Another traditional compact spectrometer working in the near infrared (NIR) includes a MEMS Fabry-Perot interferometer that serves as a tunable filter. The filter is followed by an indium gallium arsenide (InGaAs) PIN photodiode and a wiring board. The air gap in the interferometer controls the transmission response and allows certain wavelengths to pass. In this spectrometer, a single IR detector is used, but the wavelength range is 1550-1850 nm, as limited by the free-spectral range of the tunable filter and the multi-layer structure of the filter mirrors. This spectrometer may also suffer from a tradeoff between the wavelength range and the spectral resolution.

A deeply-etched self-aligned spectrometer based on a Michelson architecture and Fourier Transform concepts has also been developed. The MEMS spectrometer architecture compensates for verticality and dispersion problems using balancing interfaces. The MEMS chip may be fabricated, for example, using Deep Reactive Ion Etching (DRIE) of silicon, where all the mechanical, optical and electrical structures may be defined using a single lithographic step, resulting in a self-aligned spectrometer. All of the structures may be etched in the device layer of a silicon-on-insulator (SOI) wafer, with the fixed structures being anchored to the handle layer using a buried oxide layer in between the device and handle layers. Such a MEMS interferometer may be versatile enough to work in the IR with very wide spectral range. In addition, the detector may also be integrated on the MEMS chip. More compact spectrometer architectures can also be achieved by replacing the Michelson interferometer with cascaded low-finesse Fabry Perot interferometers.

Based on the MEMS architecture, a compact spectrometer with a photodetector integrated on-chip while the input light is delivered using a multimode optical fiber has also been developed. The photodetector may be assembled on the device layer of the MEMS interferometer. However, the cantilever-like style of the detector integration may lead to reliability issues. In addition, electrical isolation between the detector and other electrical elements in the device layer of the MEMS interferometer is challenging.

Other miniaturization efforts have also been reported. For example, the photodetector may be implemented as a MEMS-based IR detector, where the light incident on the IR absorber layer creates a temperature increase and causes a vertical displacement that can be sensed by means of a capacitive change. In addition, an integrated die-level optical interferometer system including a thin layer of silicon in which the electronic device, photodetector, light source and a movable device are all fabricated has also been developed. While miniaturization efforts continue to rapidly advance the capabilities of compact optical sensors, additional enhancements are desired to reduce the cost, extend the operating wavelength range, and enable integration of such compact optical sensors into handheld devices.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the disclosure provide an integrated spectral unit including a micro-electro-mechanical systems (MEMS) interferometer fabricated within a first substrate and a light redirecting structure integrated on a second substrate, where the second substrate is coupled to the first substrate. The light redirecting structure includes at least one mirror for receiving an input light beam propagating in an out-of-plane direction with respect to the first substrate and redirecting the input light beam to an in-plane direction with respect to the first substrate towards the MEMS interferometer. The MEMS interferometer is configured to direct the received input light beam along an optical path to produce an output light beam resulting from interference experienced by the input light beam along the optical path.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
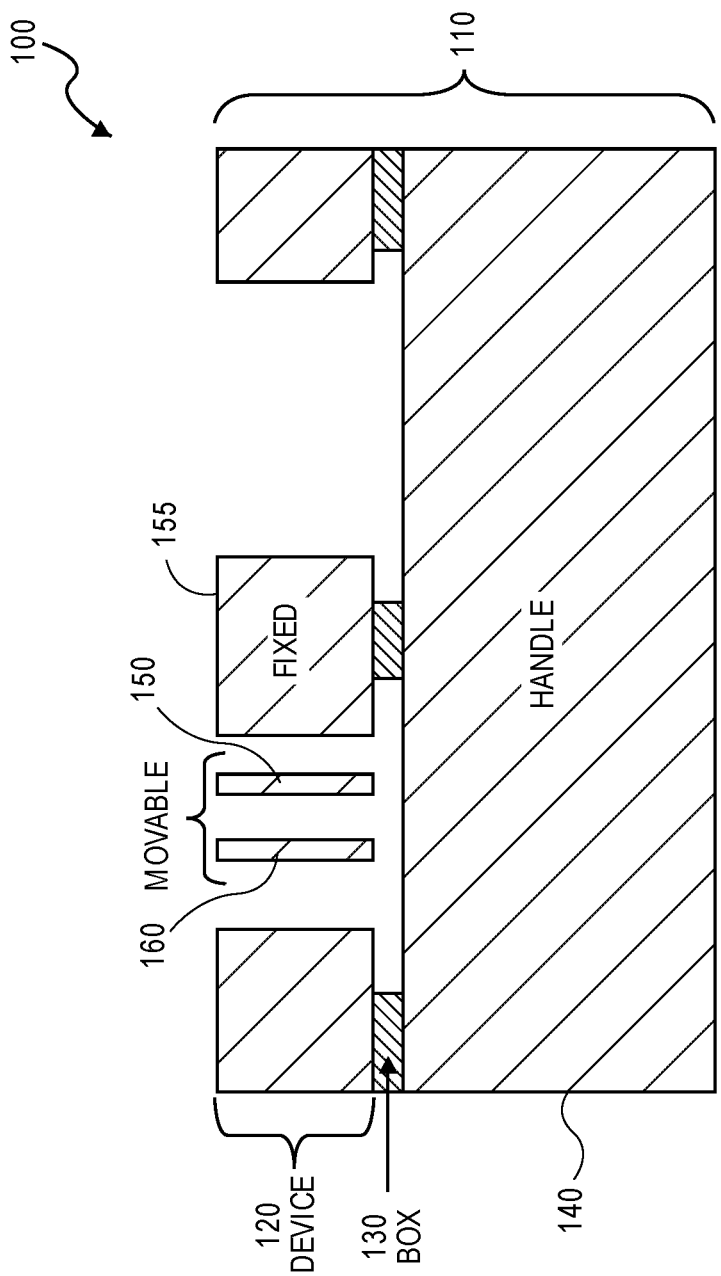
FIG. 1 is a diagram illustrating an example of a MEMS interferometer that may be fabricated as a micro-optical bench device in a semiconductor substrate, according to some aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In accordance with aspects of the present disclosure, an integrated spectral unit may be produced at lower cost and with an extended wavelength range by fabricating a MEMS interferometer within a first substrate, integrating a light redirecting structure on a second substrate, and coupling the first and second substrates together for incorporation in a small, handheld device. The light redirecting structure includes a first mirror for receiving an input light beam propagating in an out-of-plane direction with respect to the first substrate and redirecting the input light beam to an in-plane direction with respect to the first substrate towards the MEMS interferometer. The MEMS interferometer is configured to direct the received input light beam along an optical path to produce an output light beam resulting from interference experienced by the input light beam along the optical path.

The integrated spectral unit may further include a detector for receiving the output light beam from the MEMS interferometer and producing an interferogram from the output light beam. In some examples, an active area of the detector may be oriented in the out-of-plane direction with respect to the first substrate to receive the output beam propagating in the in-plane direction with respect to the first substrate.

In other examples, the active area of the detector may be oriented in the in-plane direction with respect to the first substrate. In this example, the light redirecting structure may include a second mirror at an output of the MEMS interferometer for receiving the output beam propagating in the in-plane direction with respect to the first substrate and redirecting the output beam to the out-of-plane direction with respect to the substrate towards the detector. In some examples, one or both of the first mirror and the second mirror may have a curved surface, such as a toroidal surface. The first and second mirrors may further be monolithically fabricated within the light redirecting structure and self-aligned. In some examples, the first mirror may include a first input mirror and a second input mirror that are optically coupled in a telescopic configuration. In some examples, the first mirror may include a total internal reflection mirror within the light redirecting structure.

In some examples, the detector may be assembled on (e.g., attached to) the light redirecting structure. For example, the light redirecting structure may form a capping layer extending over the MEMS interferometer to hermetically seal the MEMS interferometer, and the detector may be integrated on a top surface or bottom surface of the capping layer. In other examples, the detector may be assembled or integrated on the first substrate or on a third substrate. If the detector is assembled or integrated on a third substrate, the first substrate and the second substrate may further be assembled on the third substrate. For example, the detector may be positioned within a groove in the third substrate or on a surface of the third substrate within an opening of the first substrate. The light redirecting structure may further include spacers or pads to facilitate assembly of the light redirecting structure together with the MEMS interferometer on the third substrate In some examples, the third substrate is a package substrate of a package that further includes a window that is transparent within a wavelength range of operation of the MEMS interferometer. In this example, the input light beam may propagate through the window towards the first mirror of the light redirecting structure in the out-of-plane direction with respect to the first substrate. The window may be, for example, a glass lid, that includes a glass molded lens optically coupled to focus the input light beam on the first mirror of the light redirecting structure.

The package may further include a light source for emitting the input light beam. In some examples, the light source may be assembled or integrated on the light redirecting structure, and the light redirecting structure may further include an optical component optically coupled to redirect the input light beam from the light source. In other examples, the light source may be assembled or integrated on the first substrate.

In some examples, the MEMS interferometer may include one or more grooves and the light redirecting structure may include one or more protrusions that each fit into a corresponding one of the one or more grooves such that the integration of the MEMS interferometer and the light redirecting structure may be carried out in a passive alignment manner. In some examples, one or more of the protrusions may function as waveguides to direct the input light beam into the MEMS interferometer.

In some examples, the second substrate including the light redirecting structure is a precision molded component that may be fabricated by plastic injection molding or by glass molding. In this example, the first mirror may be coated by a thin film (e.g., metal) to improve the reflectivity. The input light beam may propagate through the light redirecting structure to impinge on the first mirror or may be directed to the first mirror through an aperture in the light redirecting structure.

The MEMS interferometer may include a Michelson interferometer or cascaded Fabry-Perot interferometers. Thus, the MEMS interferometer may include at least one moveable mirror coupled to at least one actuator configured to displace the at least one moveable mirror to vary the optical path within the MEMS interferometer. In this example, the first substrate may further include at least one through via configured to provide electrical connectivity to the at least one actuator.

In some examples, the first substrate is a silicon-on-insulator (SOI) wafer that includes a device layer, a handle layer, and a buried oxide layer between the device layer and the handle layer. The MEMS interferometer may be fabricated within the device layer. For example, the MEMS interferometer may be a micro-optical bench device fabricated using deep etching of the device layer. In addition, in some examples, the detector may be assembled or integrated on the handle layer on a same side of the first substrate as the MEMS interferometer. In this example, the handle layer may further include a through via configured to provide electrical connectivity to the detector.

FIG. 1 illustrates an example of a MEMS interferometer 100 that may be fabricated as a micro-optical bench device using a deep etching technology, such as Deep Reactive Ion Etching (DRIE), in a semiconductor substrate 110. The semiconductor substrate 110 may be, for example, a silicon-on-insulator (SOI) wafer that includes a device layer 120, a handle layer 140, and a buried oxide (BOX) layer 130 sandwiched between the device layer 120 and the handle layer 140. Various components of the MEMS interferometer, such as mirrors 150 and 155, a MEMS actuator 160, and other optical components may be defined using a single lithographic step and etched in the device layer 120 using a highly anisotropic process until the etch stop (BOX) layer 130 is reached. Any moveable parts, such as a moveable mirror 150 and the MEMS actuator 160 may be released by selectively removing the BOX layer 130 underneath the moveable parts.

Figure 2:
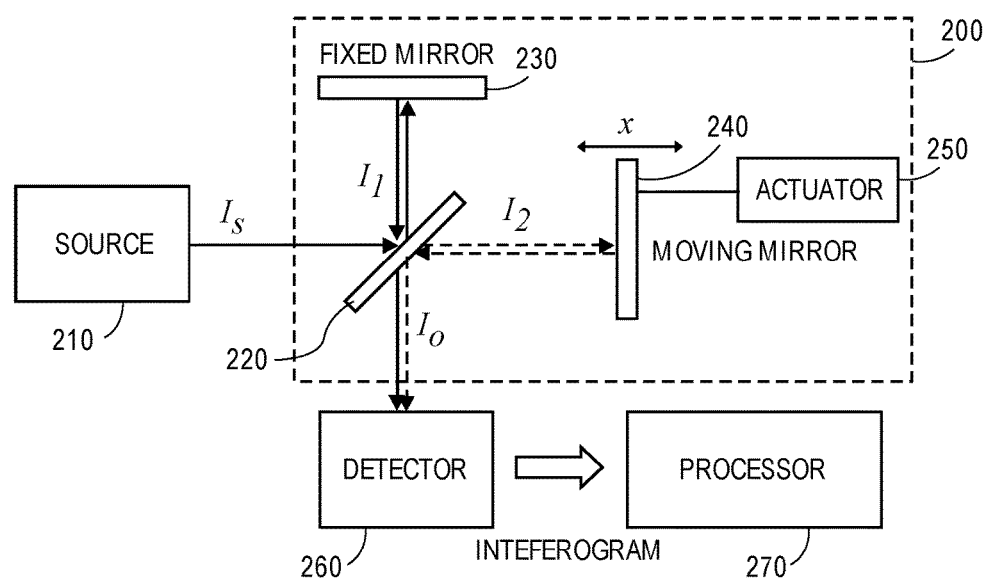
FIG. 2 is a diagram illustrating an example of a Michelson interferometer that may be fabricated as a micro-optical bench device, according to some aspects of the disclosure.

FIG. 2 illustrates an example of a MEMS interferometer 200 that may be fabricated as a micro-optical bench device, as shown in FIG. 1. The example shown in FIG. 2 is a Michelson interferometer. However, in other examples, other types of interferometers, such as Fabry-Perot and Mach-Zehnder interferometers, may be utilized. In FIG. 2, collimated light $I_s$ from a broadband source 210 is split into two beams $I_1$ and $I_2$ by a beam splitter 220. One beam $I_1$ is reflected off a fixed mirror 230 and the other beam $I_2$ is reflected off a moving mirror 240 coupled to an actuator 250, such as a MEMS actuator.

In one example, the MEMS actuator 250 is an electrostatic actuator formed of a comb drive and spring. By applying a voltage to the comb drive, a potential difference results across the actuator 250, which induces a capacitance therein, causing a driving force to be generated as well as a restoring force from the spring, thereby causing a displacement of moveable mirror 240 to the desired position for reflection of the beam $L_2$. An optical path length difference (OPD) is then created between the reflected beams that is substantially equal to twice the mirror 240 displacement. In other examples, the MEMS actuator 250 may include a thermal actuator or other type of actuator.

The reflected beams interfere at the beam splitter 220 to produce an output light beam $I_o$, allowing the temporal coherence of the light to be measured at each different Optical Path Difference (OPD) offered by the moving mirror. The signal corresponding to the output light beam $I_o$ may be detected and measured by a detector 260 at many discrete positions of the moving mirror to produce an interferogram. In some examples, the detector 260 may include a detector array or a single pixel detector. The interferogram data verses the OPD may be input to a processor 270. The spectrum may then be retrieved, for example, using a Fourier transform carried out by the processor 270.

The processor 270 may be a single processing device or a plurality of processing devices. Such a processing device may be a microprocessor, micro-controller, digital signal processor, microcomputer, central processing unit, field programmable gate array, programmable logic device, logic circuitry, analog circuitry, digital circuitry, and/or any device that manipulates signals (analog and/or digital) based on hard coding of the circuitry and/or operational instructions. The processor 270 may have an associated memory and/or memory element, which may be a single memory device, a plurality of memory devices, and/or embedded circuitry of the processor. Such a memory device may be a read-only memory, random access memory, volatile memory, non-volatile memory, static memory, dynamic memory, flash memory, cache memory, and/or any device that stores digital information.

Figure 3:
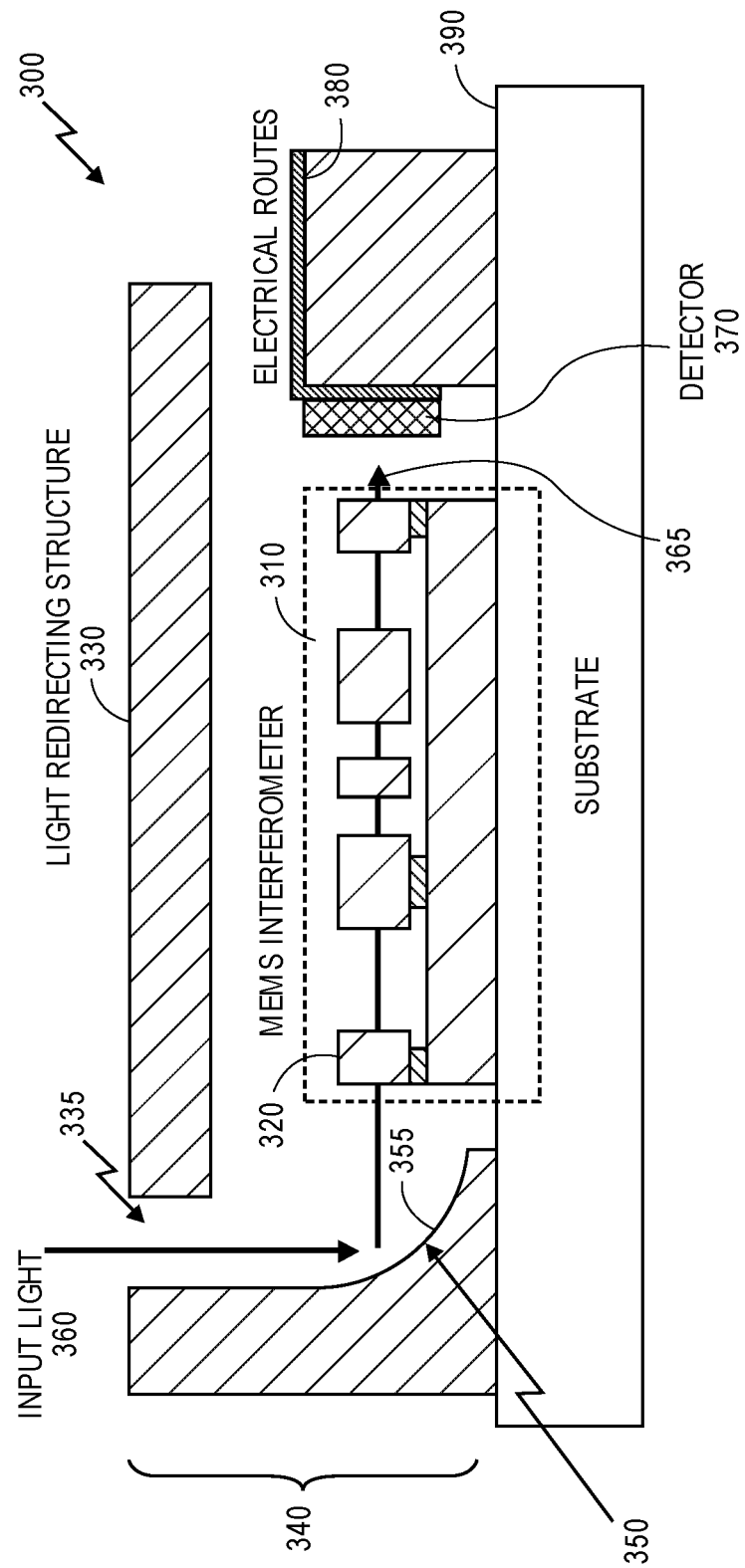
FIG. 3 is a diagram illustrating an example of an integrated spectral unit including a MEMS interferometer and a light redirecting structure, according to some aspects of the disclosure.

In accordance with various aspects of the present disclosure, the MEMS interferometer 200 shown in FIG. 1 or 2 may be included within an integrated spectral unit to reduce the cost of incorporating the MEMS interferometer into a small, handheld device. FIG. 3 illustrates an example of an integrated spectral unit 300 including a MEMS interferometer 310. The MEMS interferometer 310 is fabricated within a first substrate 320, such as an SOI wafer, as illustrated in FIG. 1. The integrated spectral unit 300 further includes a light redirecting structure 330 integrated on a second substrate 340. The second substrate 340 may be, for example, a semiconductor substrate or a precision molded component. For example, the second substrate 340 may be a plastic molded component or a glass molded component fabricated using high precision injection molding.

The light redirecting structure 330 includes a first mirror 350 optically coupled to receive an input light beam 360 propagating in an out-of-plane direction with respect to the first substrate 320 (e.g., the MEMS interferometer substrate). The light redirecting structure 330 further includes an aperture 335 within the second substrate 340 through which the input light beam 360 passes towards the first mirror 350, which is formed within the second substrate 340.

The first mirror 330 is further oriented to redirect the input light beam to an in-plane direction with respect to the first substrate 320 towards the MEMS interferometer 310. In some examples, as illustrated in FIG. 3, the first mirror 350 may have a curved surface 355, such as a toroidal surface, to redirect the input light beam 360 towards the MEMS interferometer 310. In other examples, the first mirror 350 may have a flat surface oriented at a forty-five degree angle with respect to the plane of the first substrate 320 to redirect the input light beam 360 towards the MEMS interferometer 310.

An output light beam 365 produced from interference experienced by the input light beam 360 along the optical path of the MEMS interferometer 310 may be input to a detector 370. The detector 370 is optically coupled to receive the output light beam 365 and to produce an interferogram from the output light beam 365. In the example shown in FIG. 3, the detector 370 is assembled on the light redirecting structure 330 such that an active area of the detector 370 is oriented in the out-of-plane direction with respect to the first substrate 320. Thus, the detector 370 is optically coupled to receive the output light beam 365 propagating in the in-plane direction with respect to the first substrate 320 from the MEMS interferometer 310.

In addition, electrical routes 380 may further be formed on the light redirecting structure 330 to provide electrical connectivity to the detector 370. For example, the interferogram may be output from the detector 370 by transforming the energy from the output light beam 365 into another form, such as a change in electrical current or electrical voltage, which may be output from the detector 370 to a processor via the electrical routes 380. In some examples, the electrical routes 380 may be fabricated on the light redirecting structure 330 such that conventional wire bonding or flip-chip packaging may be utilized. The electrical routes 380 may further be fabricated on the light redirecting structure 330 based on the method of fabrication of the light redirecting structure 330. For example, for a plastic molded light redirecting structure 330, the electrical routes 380 may be fabricated using laser direct structuring of the thermos plastic material in the form of molded interconnect devices (MIDs). This process uses doped thermoplastic materials, and the electrical routes 380 are activated by laser radiation followed by metallization in a chemical bath.

The first substrate 320 and the second substrate 340 may further be assembled on a third substrate 390. In some examples, the third substrate 390 may be a package substrate that enables the MEMS interferometer 310, the light redirecting structure 330, and the detector 370 to be integrated within a single package.

Figure 4:
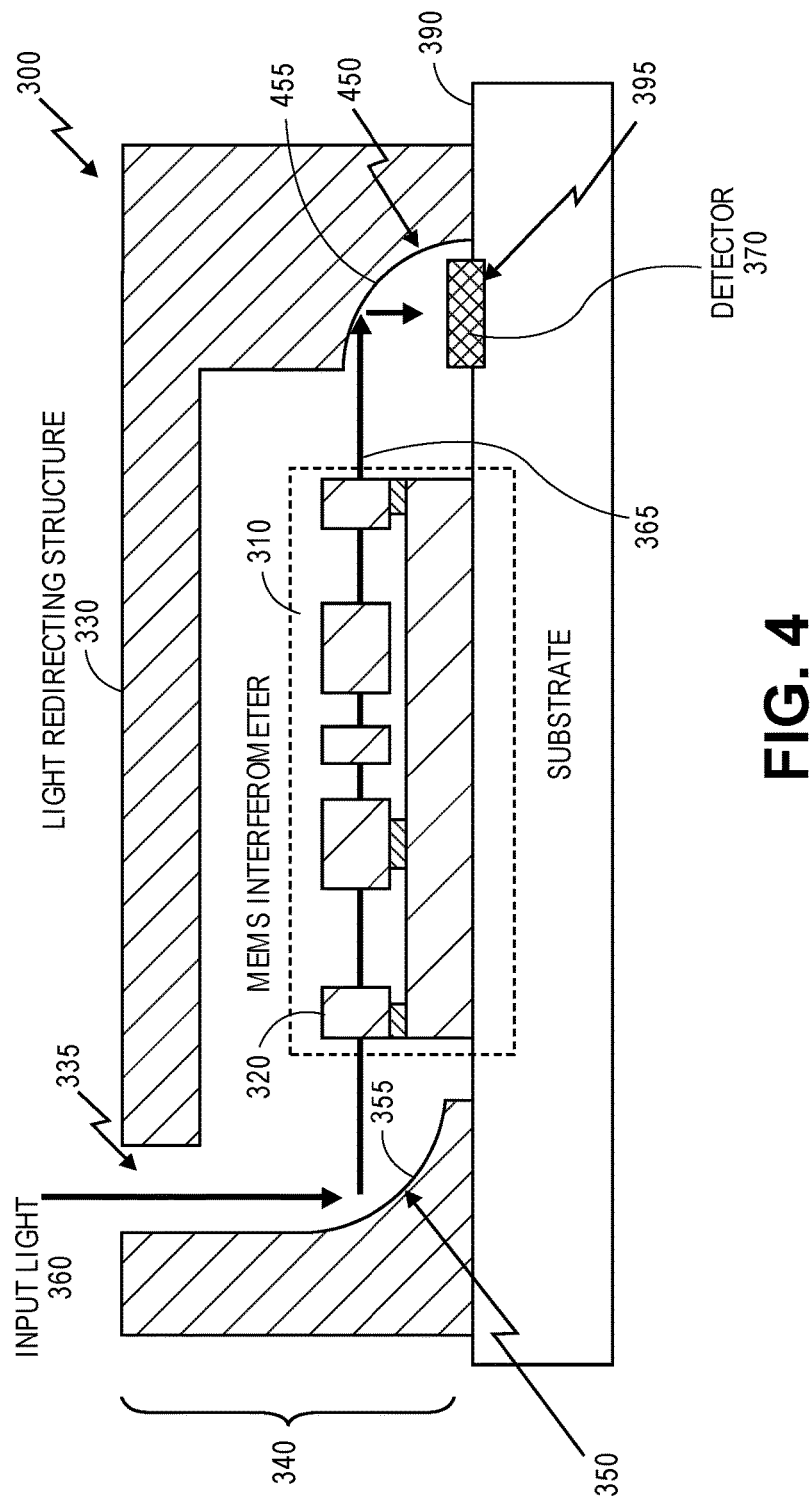
FIG. 4 is a diagram illustrating another example of an integrated spectral unit including a MEMS interferometer and a light redirecting structure, according to some aspects of the disclosure.

FIG. 4 illustrates another example of an integrated spectral unit 300 including a MEMS interferometer 310. In the example shown in FIG. 4, the detector 370 is assembled on the third substrate 390 such that the active area plane of the detector 370 is oriented in-plane with the third substrate 390. The back side of the detector 370 (e.g., the back side of the detector die) may be either level with the back side of the first substrate 320 (e.g., the back side of the MEMS die), or as shown in FIG. 4, offset from the back side of the first substrate 320 in order to optimize the coupling efficiency from the MEMS interferometer 310 to the detector 370. In the example shown in FIG. 4, the detector 370 is assembled on the third substrate 390 within a groove 395 within the third substrate 390. In some examples, the groove depth may be selected to optimize the coupling efficiency.

The light redirecting structure 330 further includes a second mirror 450 optically coupled to receive the output light beam 365 propagating in an in-plane direction with respect to the first substrate 320 from the MEMS interferometer 310 and to redirect the output light beam 365 to an out-of-plane direction with respect to the first substrate 320 towards the detector 370. In some examples, as illustrated in FIG. 4, the second mirror 450 may have a curved surface 455, such as a toroidal surface, to redirect the output light beam 365 towards the detector 370. In other examples, the second mirror 450 may have a flat surface oriented at a forty-five degree angle with respect to the plane of the first substrate 320 to redirect the output light beam 365 towards the detector 370.

In some examples, the first and second mirror surfaces 355 and 455 may be optimized to improve the coupling efficiency and minimize the loss in the optical throughput. Therefore, as shown in FIG. 4, both the first mirror 350 and the second mirror 450 include curved surfaces 355 and 455, respectively, preferably with a toroidal surface shape. The toroidal profile provides the design flexibility to have different radii of curvature for the mirrors 350 and 450 in two orthogonal planes to account for the off-axis incidence of the light (input light beam 360 and output light beam 365) on the mirror surfaces 355 and 455, respectively.

Figure 5:
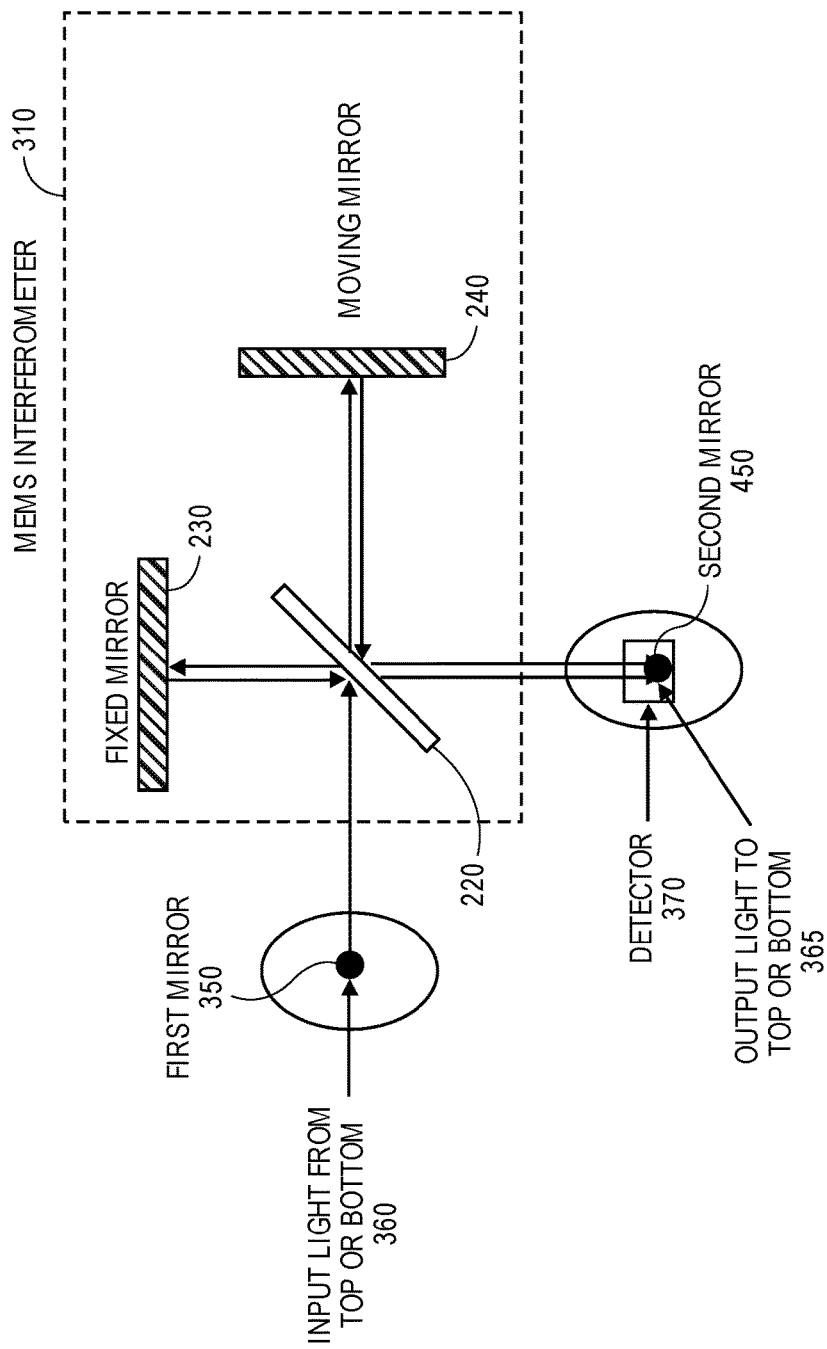
FIG. 5 is a top view of the integrated spectral unit, including the MEMS interferometer, a detector, and light redirecting mirrors, according to some aspects of the disclosure.

A top view of the MEMS interferometer 310, the detector 370 and the light redirecting mirrors 350 and 450 is illustrated in FIG. 5. In the shown view, the optical axes of the input light beam 360 to the MEMS interferometer 310 after the first mirror 350 and the output light beam 365 from the MEMS interferometer 310 before the second mirror 450 are perpendicular. However, it should be understood that depending on the design of the MEMS interferometer 310, an acute or other angle may exist. In some examples, the MEMS interferometer 310 may include a single Michelson interferometer, as shown in FIG. 5 and described above with reference to FIG. 2. For example, the MEMS interferometer 310 may include a beam splitter 220, fixed mirror 230 and moving mirror 240 coupled to an actuator (not shown). In other examples, the MEMS interferometer 310 may include multiple parallel or cascaded interferometers, such as Fabry-Perot interferometers.

Figure 6:
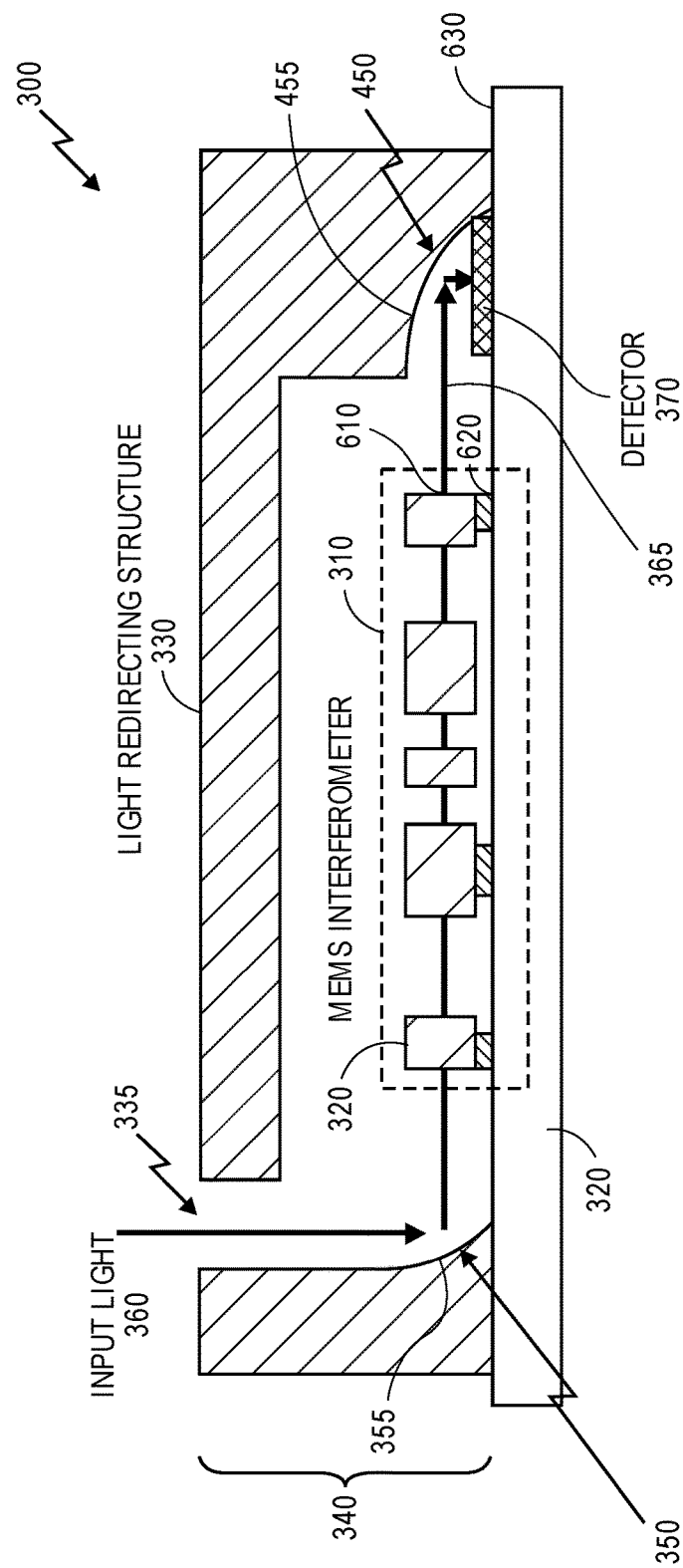
FIG. 6 is a diagram illustrating another example of an integrated spectral unit including a MEMS interferometer and a light redirecting structure, according to some aspects of the disclosure.

FIG. 6 illustrates another example of an integrated spectral unit 300 including a MEMS interferometer 310. In the example shown in FIG. 6, both the light redirecting structure 330 and the detector 370 are assembled on the first substrate (e.g., MEMS die) 320. In examples in which the first substrate 320 is an SOI substrate including a device layer 610, a handle layer 630, and a buried oxide (BOX) layer 620 between the device layer 610 and the handle layer 630 (e.g., as similarly illustrated in FIG. 1), the components of the MEMS interferometer 310 may be fabricated in the device layer 610, while the handle layer 630 provides the support and fixation for the anchored parts of the MEMS interferometer 310. In addition, the handle layer 620 may also serve as the substrate on which the detector 370 and light redirecting structure 330 are integrated. As in FIG. 4, the light redirecting structure 330 may include both a first mirror 350 and a second mirror 450 to redirect the input/output light beams 360/365 to/from the MEMS interferometer 310 and the detector 370.

Figure 7:
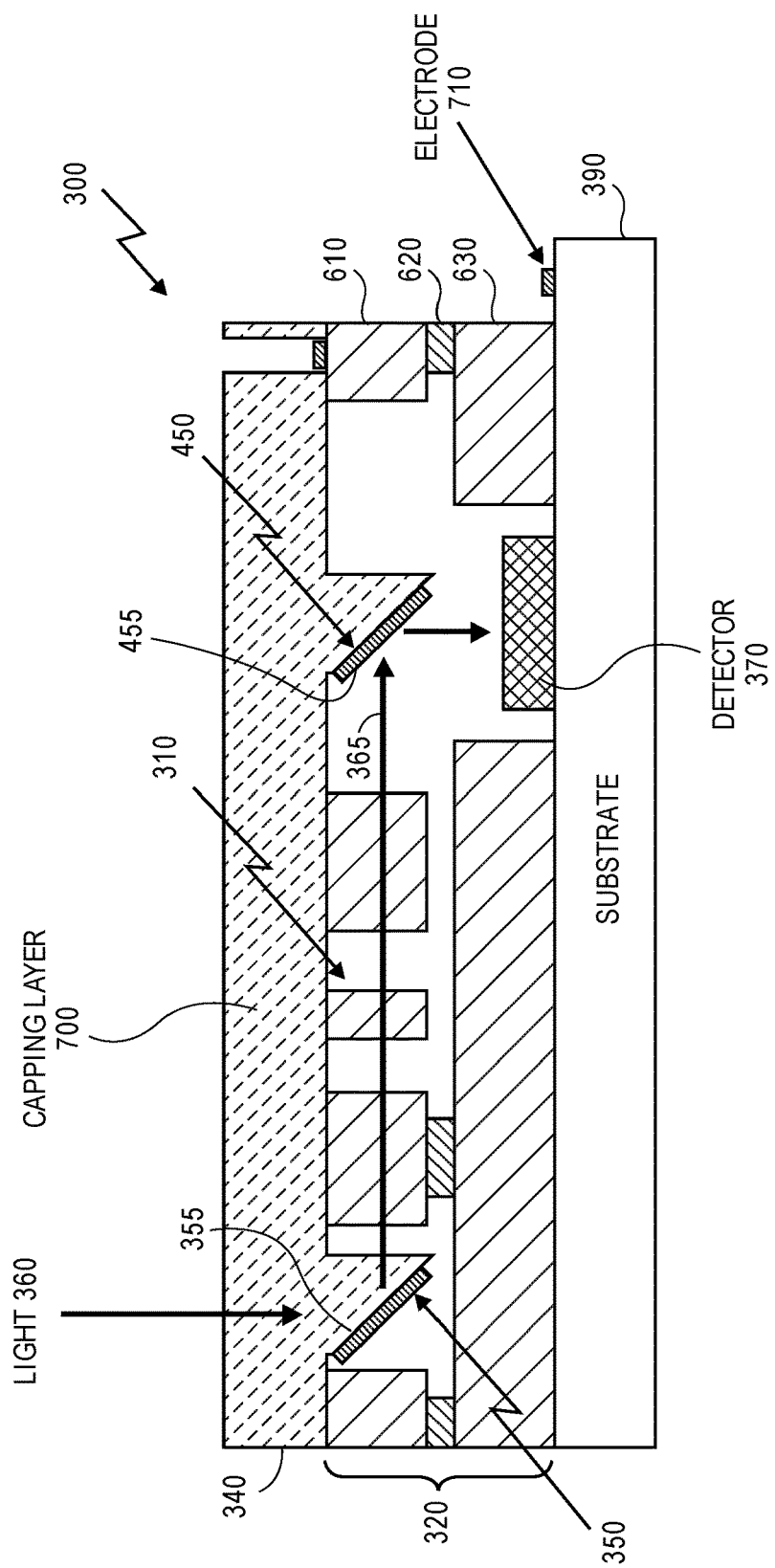
FIG. 7 is a diagram illustrating another example of an integrated spectral unit including a MEMS interferometer and a capping layer operating as a light redirecting structure, according to some aspects of the disclosure.

FIG. 7 illustrates another example of an integrated spectral unit 300 including a MEMS interferometer 310. In the example shown in FIG. 7, the light redirecting structure is configured as a capping layer 700 for the MEMS interferometer 310 to hermetically seal the MEMS interferometer 310. The capping layer 700 may be assembled on the device layer 610 or the handle layer 630 of the first substrate 320, the former being illustrated in FIG. 7. In some examples, the capping layer 700 may be fabricated in wafer batch processing form and the second substrate 340 including the capping layer 700 may be wafer bonded to the first substrate 320 including the MEMS interferometer 310 before singulation.

The first substrate 320 including the MEMS interferometer 310 may be assembled on a third substrate 390. In addition, the detector 370 may further be integrated on the third substrate 390. For example, the detector 370 may be positioned on a surface of the third substrate within an opening of the first substrate 320. The third substrate 390 may further include one or more electrodes 370 to provide an electrical connection to the detector 370 and/or MEMS components.

Depending on the spectral range of operation of the integrated spectral unit 300 and the material of the capping layer 700 (or light redirecting structure), the input light beam may be allowed to propagate inside the capping layer 700 (or light redirecting structure). For example, if the spectral range of operation is limited to a wavelength range that is smaller than or equal to 1700 nm, the transmission properties of plastic may be sufficient, whereas the absorption losses increase significantly above this wavelength range. Therefore, if the wavelength range is larger (e.g., up to 2600 nm), glass may be utilized for the capping layer 700 (or light redirecting structure) when propagation of the input light beam 360 through the capping layer 700 (or light redirecting structure) is desired. In this example, the capping layer 700 (or light redirecting structure) may be fabricated using glass molding technology.

Thus, as illustrated in FIG. 7, instead of including an aperture in the light redirecting structure, the input light beam 360 may propagate through the capping layer 700 to the first mirror 350, which may be formed on an outer (exterior) surface of the capping layer 700. Similarly, the second mirror 450 may be formed on the outer (exterior) surface of the capping layer 700 to redirect the output light beam 365 towards the detector 370. In some examples, the surfaces 355 and 455 of the first mirror 350 and the second mirror 450 may each include a thin film coating, such as a metal film coating, to improve reflectivity of the mirrors 350 and 450. In addition, each of the mirror surfaces 355 and 455 may have a curved shape or a flat shape oriented at a forty-five degree angle with respect to the plane of the first substrate 320, the latter being illustrated in FIG. 8.

Figure 8:
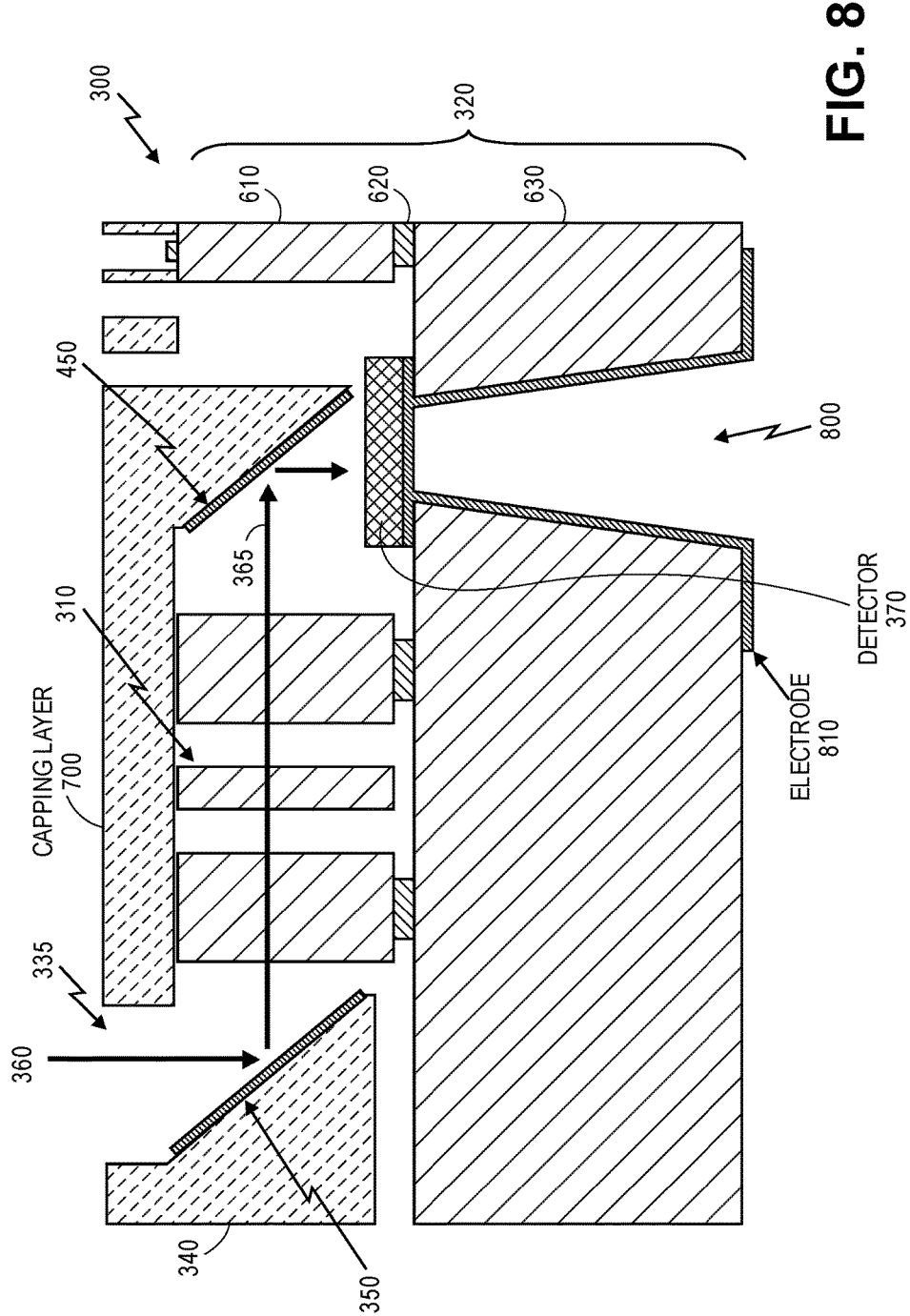
FIG. 8 is a diagram illustrating another example of an integrated spectral unit including a MEMS interferometer and a capping layer operating as a light redirecting structure, according to some aspects of the disclosure.

FIG. 8 illustrates another example of an integrated spectral unit 300 including a MEMS interferometer 310. In the example shown in FIG. 8, the detector 370 is assembled on the handle layer 630 of the first substrate 320 on the same side of the first substrate 320 as the MEMS interferometer 310. The handle layer 630 of the first substrate 320 may further include a through via 800 configured to provide electrical connectivity between the detector 370 and an electrode 810 located on the back side of the first substrate 320. In addition, the capping layer 700 may include the aperture 335 to provide the input light beam 360 directly to the first mirror 350 without propagating through the capping layer 700.

Figure 9:
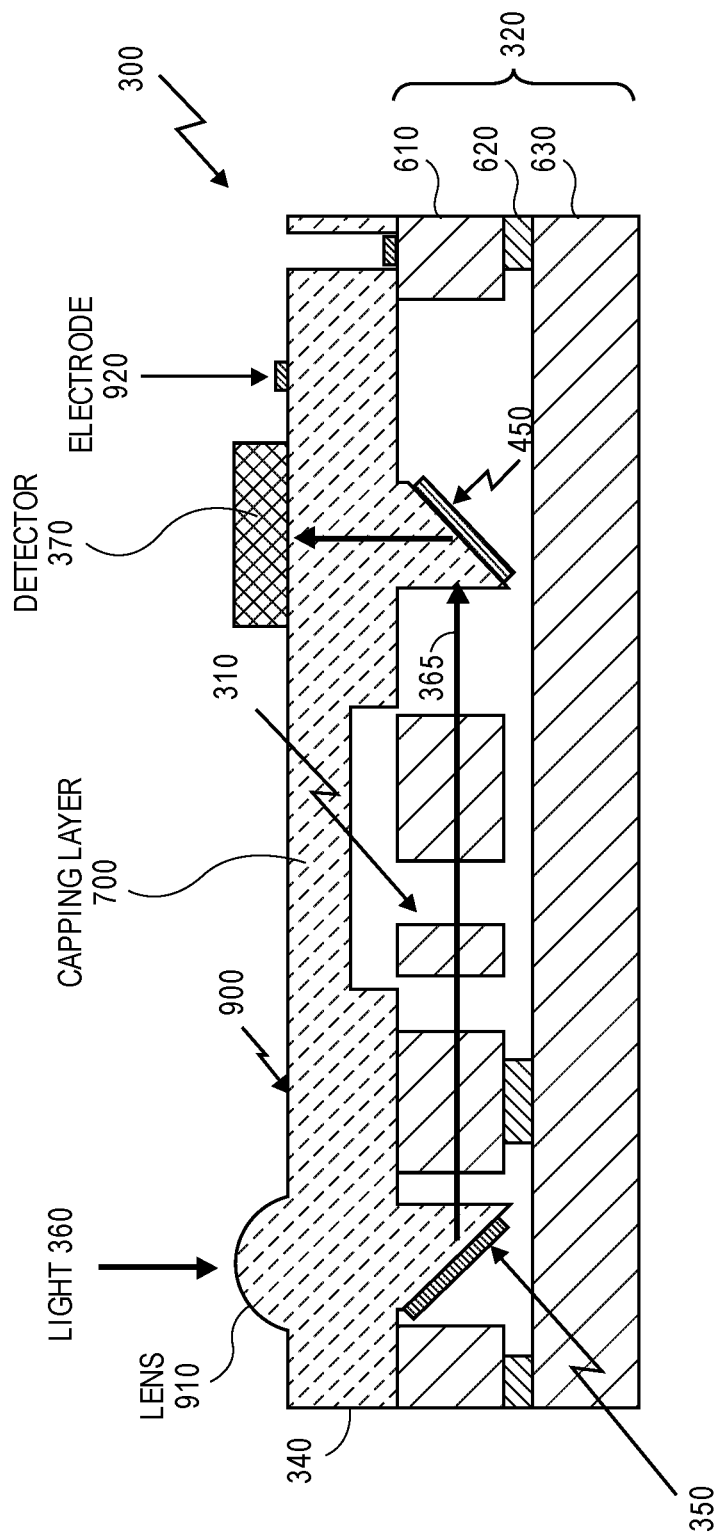
FIG. 9 is a diagram illustrating another example of an integrated spectral unit including a MEMS interferometer and a capping layer operating as a light redirecting structure, according to some aspects of the disclosure.

FIG. 9 illustrates another example of an integrated spectral unit 300 including a MEMS interferometer 310. In the example shown in FIG. 9, the detector 370 is assembled on the capping layer 700. In particular, the detector 370 is assembled on an exterior (top) surface 900 of the capping layer 700. Thus, the second mirror 450 is oriented to redirect the output light beam 365 to propagate up through the capping layer 700 to the detector 370. The capping layer 700 may further include a lens 910 to control light collimation and focusing of the input light beam 360 to propagate through the capping layer 700 to the first mirror 350. An electrode 920 may further be assembled on the exterior surface 900 of the capping layer 700 to provide electrical connectivity to the detector 370. Thus, the electrical routes of the detector 370 may be formed on the exterior surface 900 of the capping layer 700.

Figures 10A, 10B:
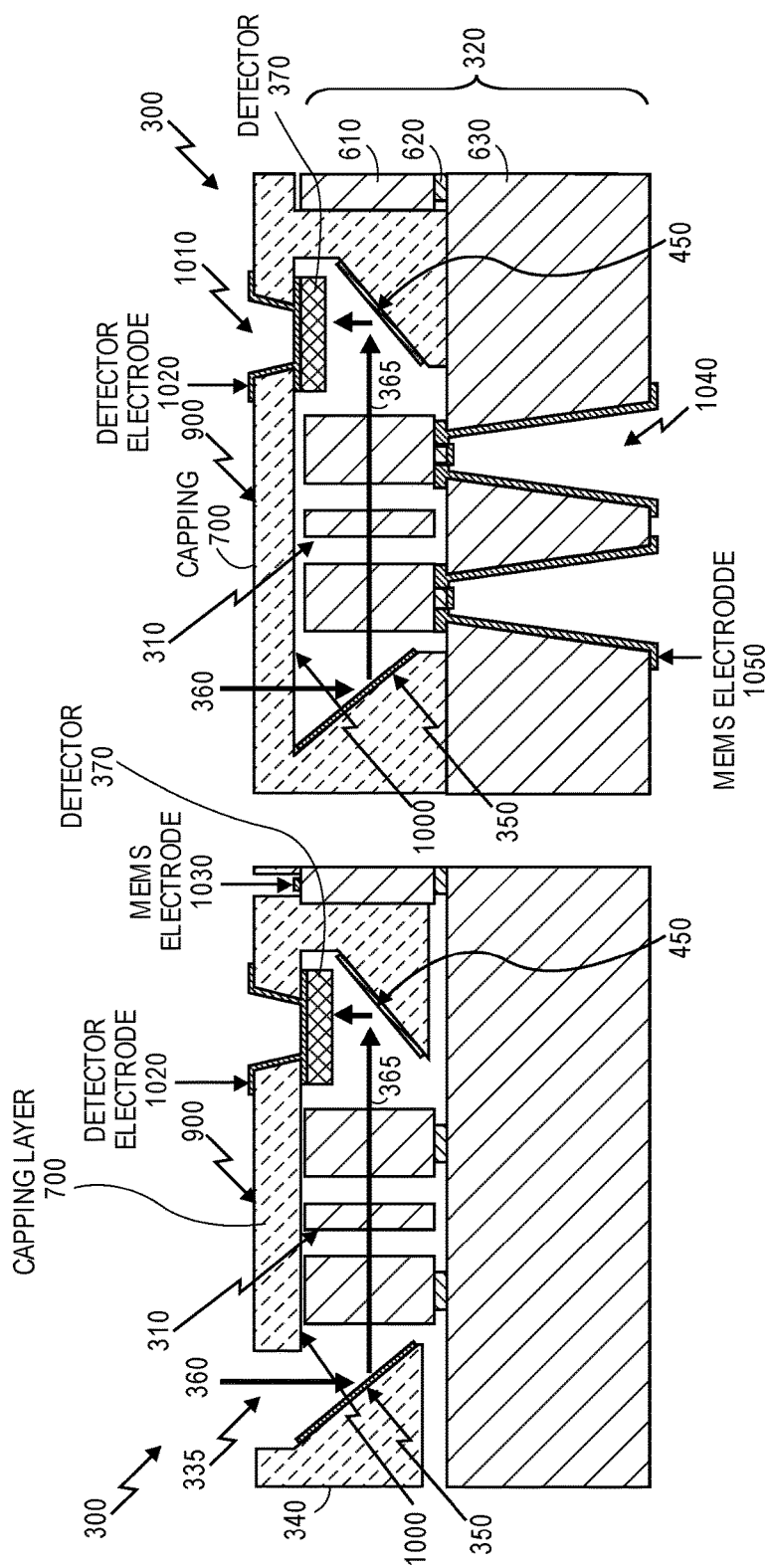
FIGS. 10A and 10B are diagrams illustrating other examples of an integrated spectral unit including a MEMS interferometer and a capping layer operating as a light redirecting structure, according to some aspects of the disclosure.

FIGS. 10A and 10B illustrate further examples of an integrated spectral unit 300 including a MEMS interferometer 310. In FIGS. 10A and 10B, the detector 370 is assembled on an interior (bottom) surface 1000 of the capping layer 700. In some examples, the detector 370 may be attached to the capping layer 700 (e.g., capping wafer) before bonding to the first substrate 320 (e.g., MEMS wafer).

In this example, the second mirror 450 is oriented to redirect the output light beam 365 up towards the detector 370 without requiring the output light beam 365 to propagate through the capping layer 700. The capping layer 700 may further include a through via 1010 configured to provide electrical connectivity to the detector 370. For example, the through via 1010 may provide electrical connectivity between the detector 370 and a detector electrode 1020 on the exterior surface 900 of the capping layer 700.

In one example, as shown in FIG. 10A, the capping layer 700 may include the aperture 335 to provide the input light beam 360 directly to the first mirror 350 without propagating through the capping layer 700. As also shown in FIG. 10A, a MEMS electrode 1030 (e.g., a pad) may be provided on the device layer 610 of the first substrate 320 to provide electrical connectivity to a MEMS actuator.

In other examples, as shown in FIG. 10B, the input light beam 360 may propagate through the capping layer 700 to the first mirror 350. As also shown in FIG. 10B, the handle layer 630 of the first substrate 320 may include one or more through vias 1040 to provide electrical connectivity between the MEMS actuator and a MEMS electrode 1050 on the backside of the first substrate 320 (e.g., MEMS wafer).

Figure 11:
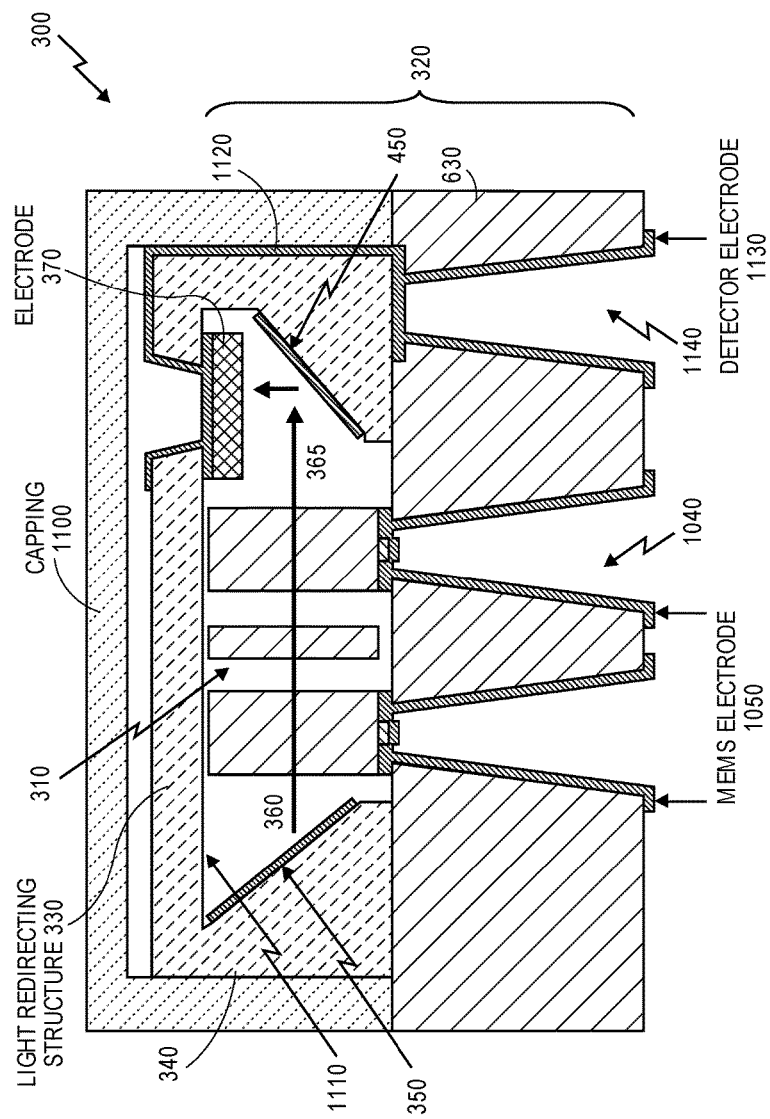
FIG. 11 is a diagram illustrating another example of an integrated spectral unit including a MEMS interferometer and a light redirecting structure, according to some aspects of the disclosure.

FIG. 11 illustrates another example of an integrated spectral unit 300 including a MEMS interferometer 310. In the example shown in FIG. 11, the light redirecting structure 330 is assembled on the first substrate 320, and a capping structure 1100 is utilized to hermetically seal the integrated spectral unit 300. In addition, as shown in FIG. 11, the detector 370 may be assembled on an interior (bottom) surface 1110 of the light redirecting structure 330, similar to the configuration shown in FIGS. 10A and 10B. Thus, the input light beam 360 may propagate through both the capping structure 1100 and the light redirecting structure 330 to the first mirror 350. After passing through the MEMS interferometer 310, the output light beam 365 may be redirected by the second mirror 450 to the detector 370 on the bottom surface 1110 of the light redirecting structure 330.

As also shown in FIG. 11, the handle layer 630 of the first substrate 320 may include one or more through vias 1040 to provide electrical connectivity between the MEMS actuator and a MEMS electrode 1050 on the backside of the first substrate 320 (e.g., MEMS wafer). In addition, electrical routes 1120 may further be formed on around the light redirecting structure 330 to connect to a detector electrode 1130 on the backside of the first substrate 320 through another via 1140 in the handle layer 630 of the first substrate 320.

Figure 12:
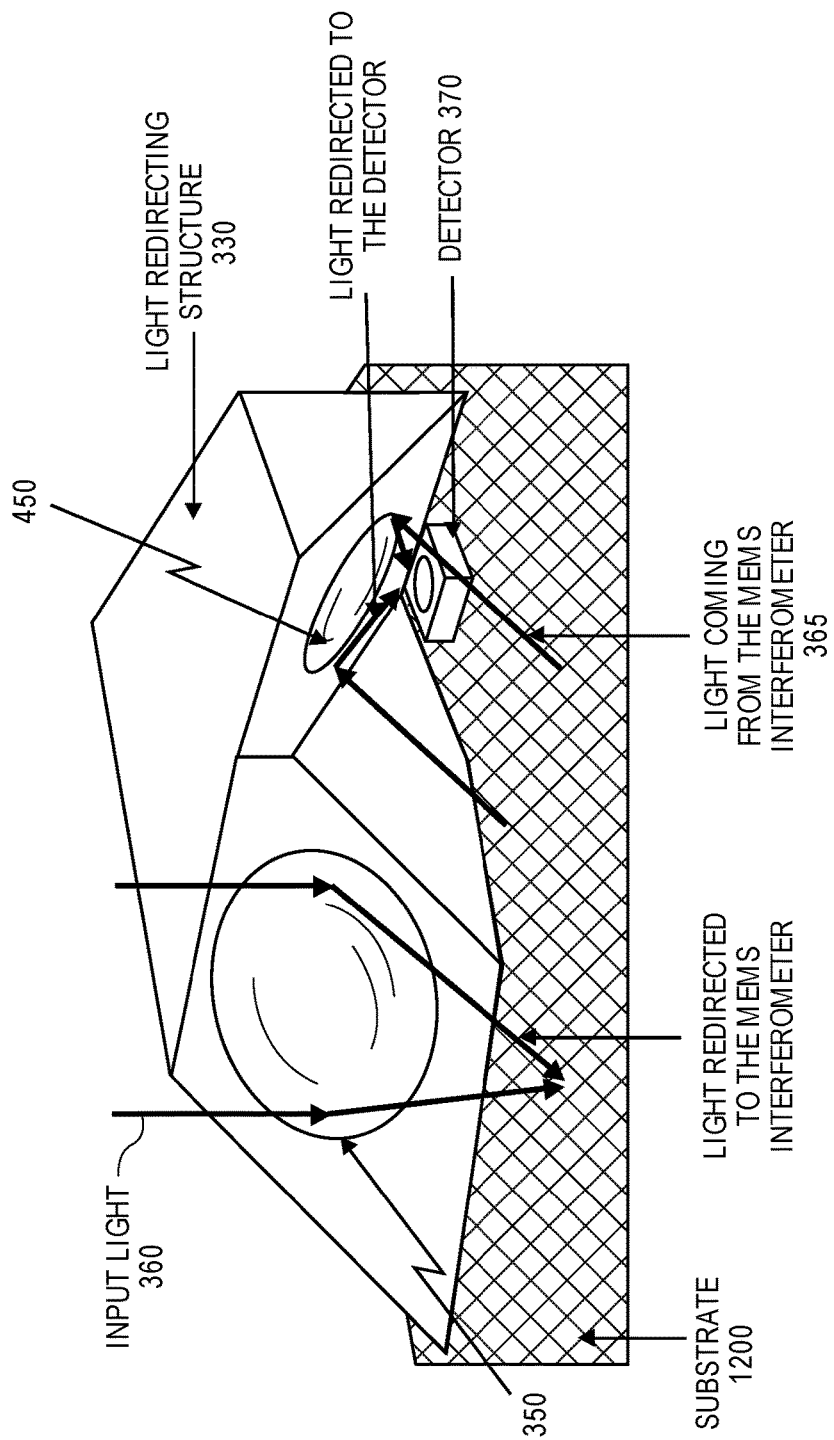
FIG. 12 is a diagram illustrating an example of a light redirecting structure, according to some aspects of the disclosure.

FIG. 12 illustrates an example of a light redirecting structure 330 including both a first (input) mirror 350 and a second (output) mirror 450. The input light beam 360 may be reflected off of the first mirror 350 and redirected towards the MEMS interferometer (not shown), while the output light beam 365 from the MEMS interferometer may be reflected off the second mirror 450 and redirected towards the detector 370, which may be assembled on a substrate 1200, such as the MEMS substrate (e.g., first substrate) or a package substrate.

In some examples, the mirrors 350 and 450 may be monolithically integrated and self-aligned with respect to one another by fabricating the light redirecting structure 330 using high precision injection molding. For example, the light redirecting structure 330 may be fabricated using a thermos plastic that is injected into a master mold. The master mold may be created using, for example, electrical discharge machining, while the high quality optical surfaces (e.g., the mold for the mirrors 350 and 450) may be diamond-turned to achieve the required profile and surface roughness.

Figure 13:
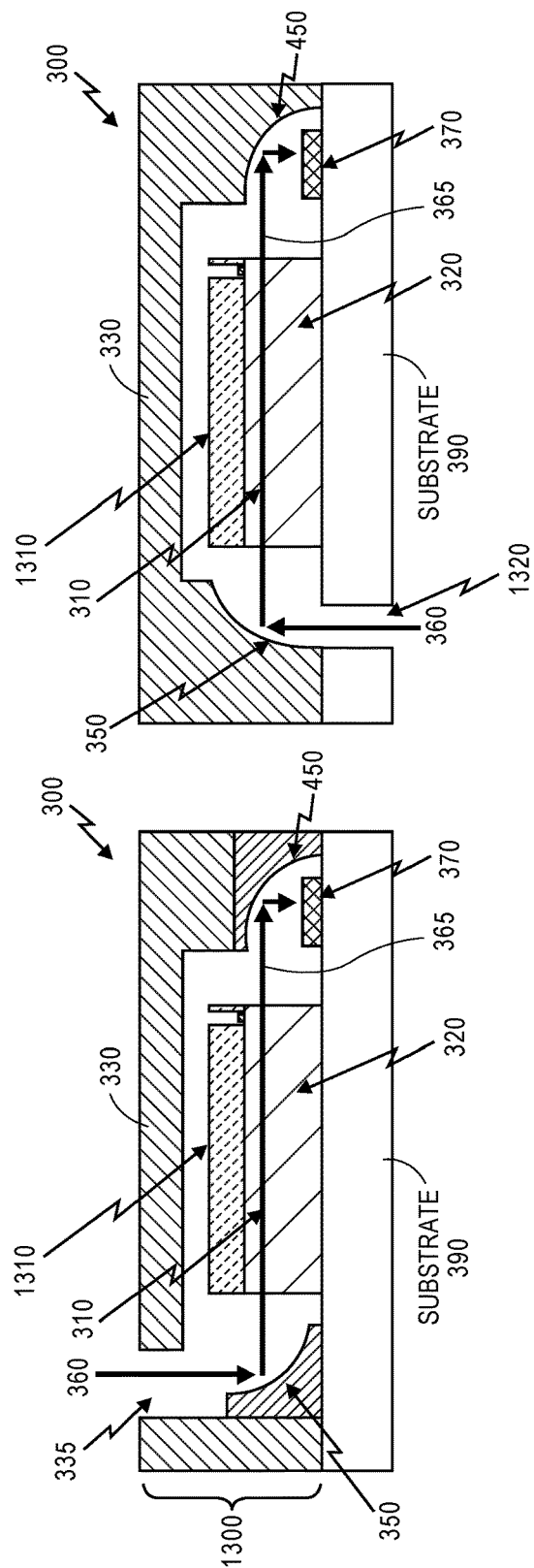
FIGS. 13A and 13B are diagrams illustrating other examples of an integrated spectral unit including a MEMS interferometer and a light redirecting structure, according to some aspects of the disclosure.

In order to improve the reflectivity of the mirrors 350 and 450, thin film coating of the mirror surfaces may be performed using, for example, sputtering, evaporation, or any thin film deposition process. In some examples, a metal thin film may be utilized to provide a very wide spectral range. However, the thin film coating process may be expensive relative to a low cost plastic injection molded device. Therefore, in some examples, to avoid multiple coating processes, as shown in FIG. 13A, the mirrors 350 and 450 may be injection molded separately and assembled into a carrier block 1300 forming the light redirecting structure 330. The carrier block 1300, the MEMS die (e.g., the first substrate) 320 including the MEMS interferometer 310, and the detector 370 may then all be assembled on the third substrate (e.g., a package substrate) 390. In some examples, the carrier block 1300 may include the aperture 335 to allow the input light beam 360 to propagate directly to the first mirror 350, especially if the carrier block material is opaque. The MEMS interferometer 310 may further include a capping structure 1310 to hermetically seal the MEMS interferometer 310.

Instead of separately injection molding the mirrors 350 and 450, in other examples, as shown in FIG. 13B, the mirrors 350 and 450 of a one-piece light redirecting structure 330 may be designed such that the mirror surfaces 355 and 455 are oriented in the same direction. In this way, a single evaporation process may be utilized to coat all of the mirrors 350 and 450 simultaneously. In the example shown in FIG. 13B, the mirrors 350 and 450 are each curved downward such that the mirror surfaces 355 and 455 face the third substrate 390. In some examples, the third substrate 390 may include an aperture 1320 to allow transmission of the input light beam 360 through the third substrate 390 from the backside of the integrated spectral unit 300.

Figure 14:
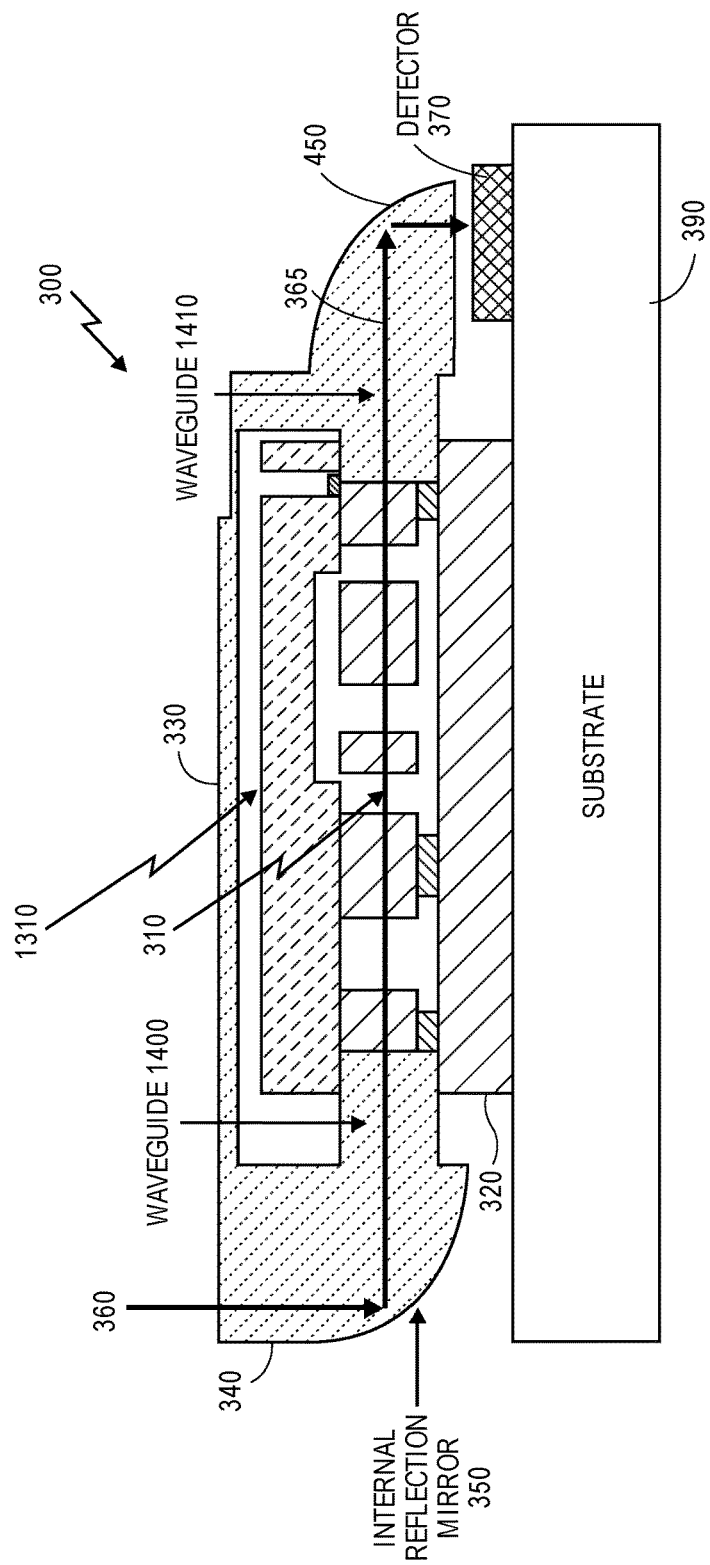
FIG. 14 is a diagram illustrating another example of an integrated spectral unit including a MEMS interferometer and a light redirecting structure, according to some aspects of the disclosure.

FIG. 14 illustrates another example of an integrated spectral unit 300 including a MEMS interferometer 310. In the example shown in FIG. 14, the first mirror 350 and the second mirror 450 of the light redirecting structure 330 may be internal reflection mirrors. Each of the internal reflection mirrors 350 and 450 may be a flat mirror, which may resemble a prism, or a curved mirror, as shown in FIG. 14, to improve the coupling efficiency to the MEMS interferometer 310 and to the detector 370. In addition, the light redirecting structure 330 may further include waveguides 1400 and 1410 to confine the input/output light beams 360 and 365 while being delivered to/from the MEMS interferometer 310. The detector 370 and the first substrate 320 including the MEMS interferometer 310 may both be assembled on the third substrate 390, whereas the second substrate 340 including the light redirecting structure 330 may be assembled on the first substrate 320. The MEMS interferometer 310 may further include the capping structure 1310 to hermetically seal the MEMS interferometer 310.

Figure 15:
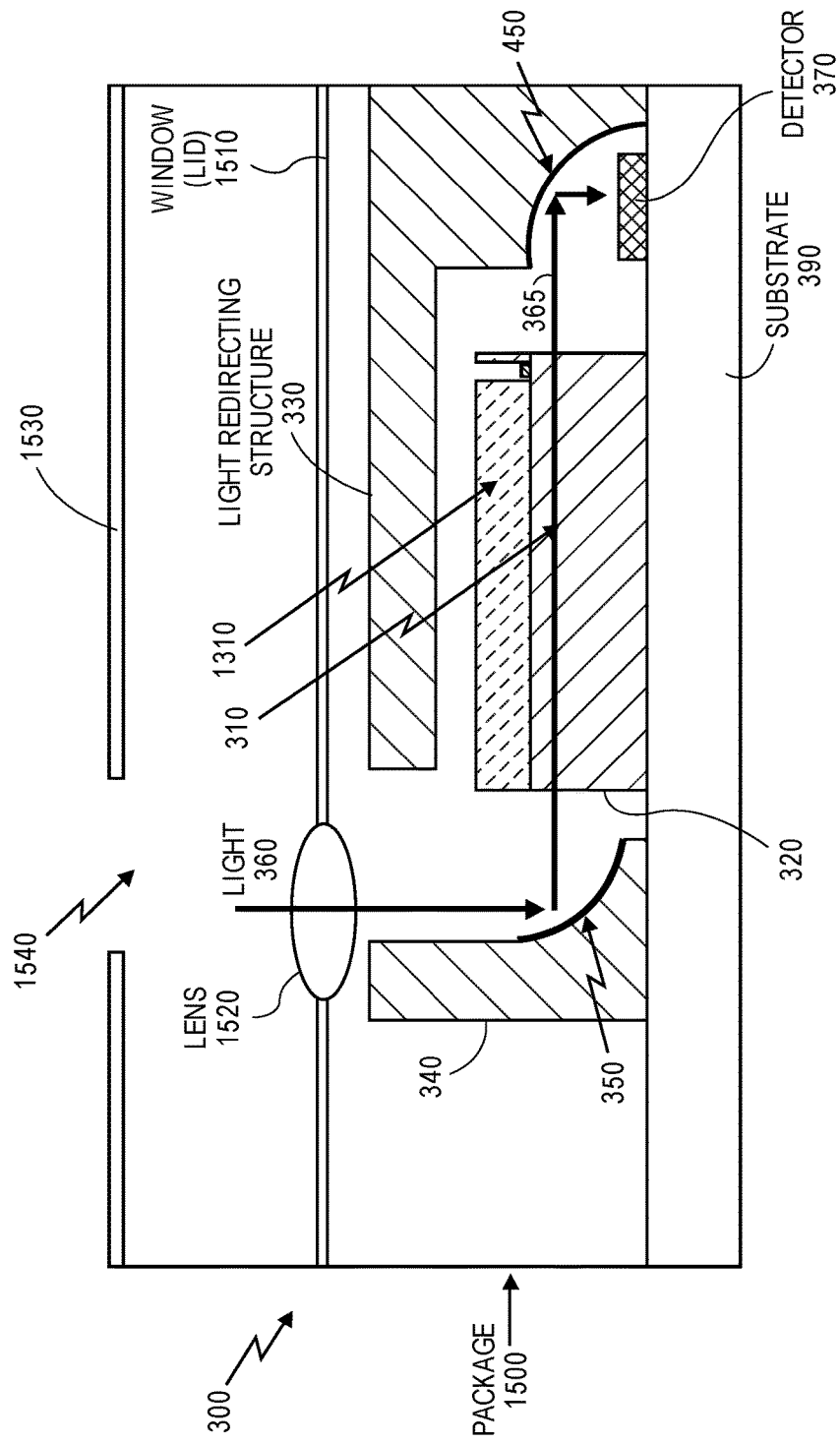
FIG. 15 is a diagram illustrating an example of a package including an integrated spectral unit, according to some aspects of the disclosure.

FIG. 15 illustrates another example of an integrated spectral unit 300 including a MEMS interferometer 310. In the example shown in FIG. 15, the integrated spectral unit 300 is integrated into a package 1500 including a package substrate 390. The first substrate 320 (e.g., MEMS die including the MEMS interferometer 310), second substrate 340 (e.g., light redirecting die including the light redirecting structure 330 with mirrors 350 and 450) and the detector 370 (e.g., detector die) may be integrated into the package 1500 and assembled on the package substrate 390 using, for example, an epoxy that can absorb the mismatch in the coefficient of thermal expansion between the dies. The MEMS interferometer 310 may further include the capping structure 1310 to hermetically seal the MEMS interferometer 310.

The package 1500 may further include a window (or lid) 1510 configured to close or seal the package 1500. The window 1510 is transparent in the wavelength range of operation of the integrated spectral unit 300 (e.g., the window 1510 is transparent to the input light beam 360). In some examples, an anti-reflective coating layer may be applied to the window 1510 to enhance the transmission response of the window 1510. An optical lens 1520 may further be assembled in the window 1510 or fabricated together with the window 1510 in a monolithic manner. For example, the window 1510 and lens 1520 may be fabricated monolithically using glass molding technology. If the window 1510 and lens 1520 are assembled together, the window 1510 may be fabricated with an aperture using plastic molding technology, and the lens 1520 may be assembled into the aperture with an epoxy. In other examples, the lens 1520 may be fabricated and bonded to the window 1510. In this example, a plano-convex lens may be utilized.

The package 1500 may further include an aperture 1540 configured to limit the light acceptance angle of the integrated spectral unit 300. The aperture 1540 may be machined within a second window (or lid) 1530 that is assembled on the first window (or lid) 1510. In some examples, the aperture 1540 may be a clear area on the second lid 1530, while the remaining area of the second lid 1540 is coated with a material that absorbs the light. In some examples, the second lid 1540 may be the same as the first lid 1510.

Figure 16:
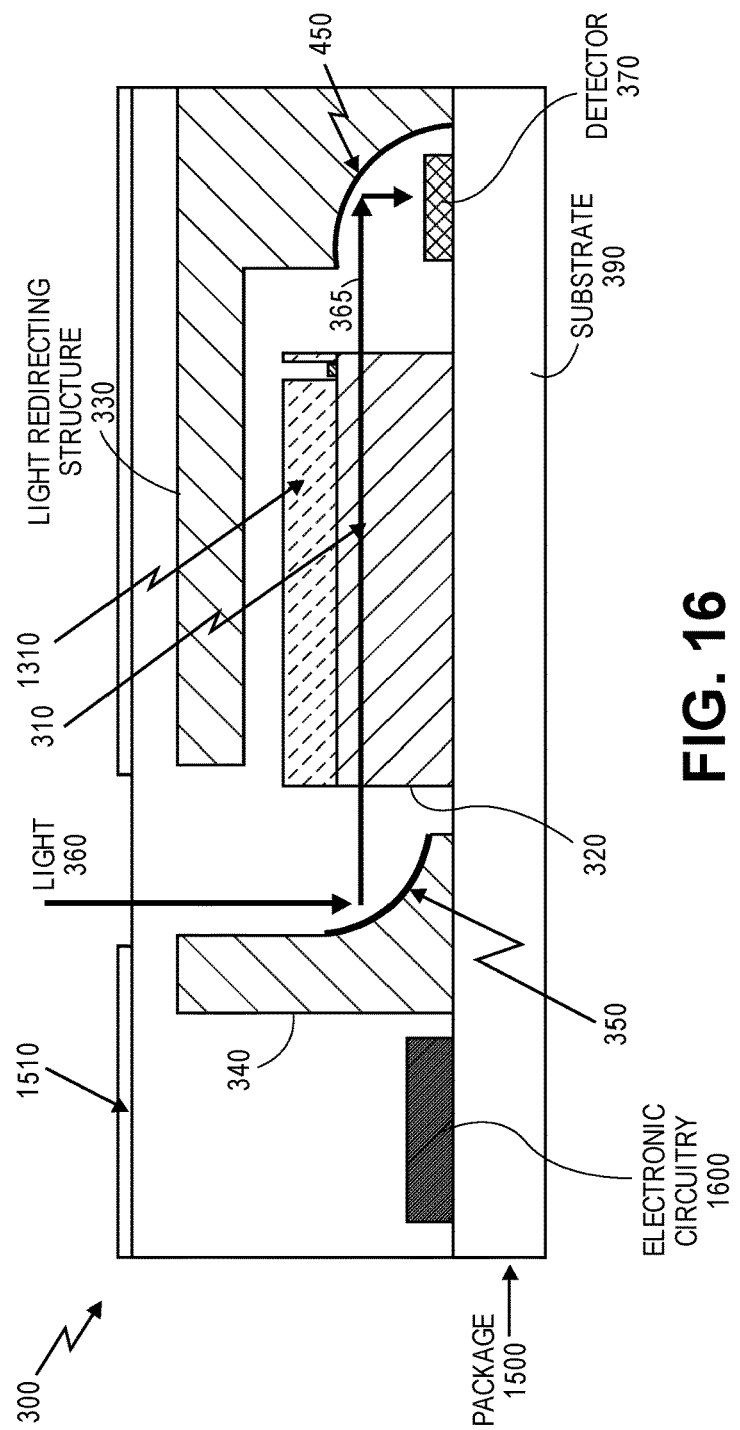
FIG. 16 is a diagram illustrating another example of a package including an integrated spectral unit, according to some aspects of the disclosure.

FIG. 16 illustrates another example of an integrated spectral unit 300 including a MEMS interferometer 310. In the example shown in FIG. 16, the package 1500 may further include electronic circuitry 1600 utilized to drive the MEMS die 320, sense the motion of the moveable parts (e.g., the MEMS actuator(s) and moveable mirror(s)) in the MEMS interferometer 310 and apply signal conditioning and signal processing to the interferogram produced by the detector 370. In some examples, the electronic circuitry 1600 may include a single application-specific integrated circuit (ASIC) chip or multiple chips with discrete components. The discrete components may be integrated inside the same package 1500 or may be assembled on an electronic circuit board together with the package 1500.

Figure 17:
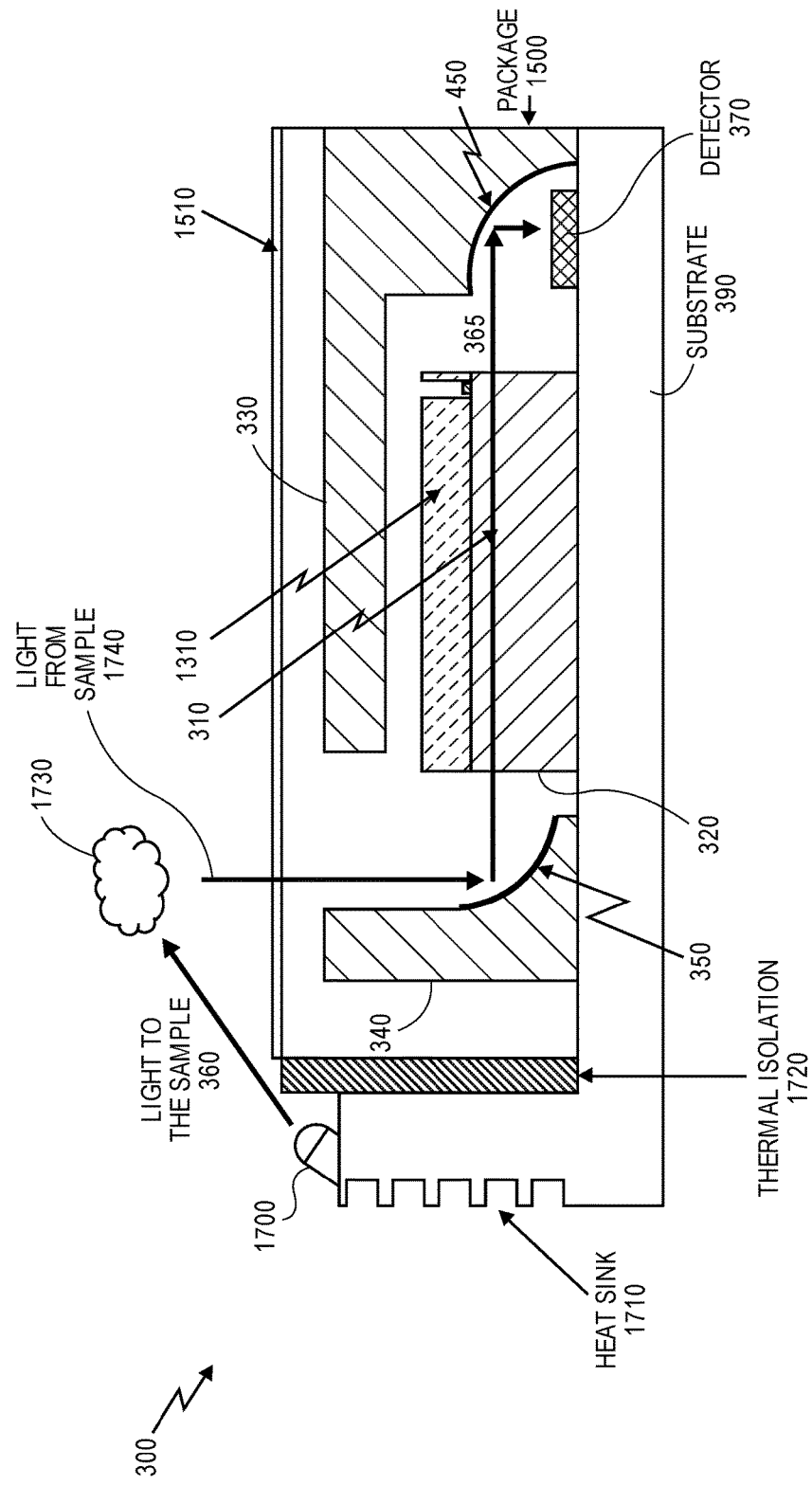
FIG. 17 is a diagram illustrating another example of a package including an integrated spectral unit, according to some aspects of the disclosure.

FIG. 17 illustrates another example of an integrated spectral unit 300 including a MEMS interferometer 310. In the example shown in FIG. 17, the package 1500 may further include a light source 1700 configured to emit the input light beam 360. In some examples, the light source 1700 may include one or more wideband thermal radiation sources or a quantum source with an array of light emitting devices that cover the wavelength range of interest. The output (input light beam 360) of the light source 1700 may further be optically treated using a lens or reflector (not shown) to increase the coupling efficiency. For example, a lens used to couple the input light beam 360 from the light source 1700 may be fabricated of molded glass integrated into the light source 1700 itself or integrated into the window 1510 of the package 1500.

The package 1500 may further include a heat sink 1710 for the light source 1700 and thermal isolation 1720 between the light source and the integrated spectral unit 300. In some examples, the light source 1700 may be assembled on the package 1500 in a surface mount style to reduce the cost of assembly and electrical soldering.

In some examples, the integrated spectral unit 300 may be utilized as a Fourier Transform (FT) spectrometer, where the light source 1700 is optically coupled to emit the input light beam 360 towards a sample under test (SUT) 1730 and the light 1740 transmitted and/or reflected from the SUT 1730 may be input to the integrated spectral unit 300. In this example, the output data from the detector 370 includes the interferogram signal verses the optical path difference caused by motion of one or more moveable mirrors in the MEMS interferometer 310. The interferogram signal may be processed, and a mathematical transform applied to obtain the spectrum of the light 1740 coming from the SUT 1730.

Figure 18:
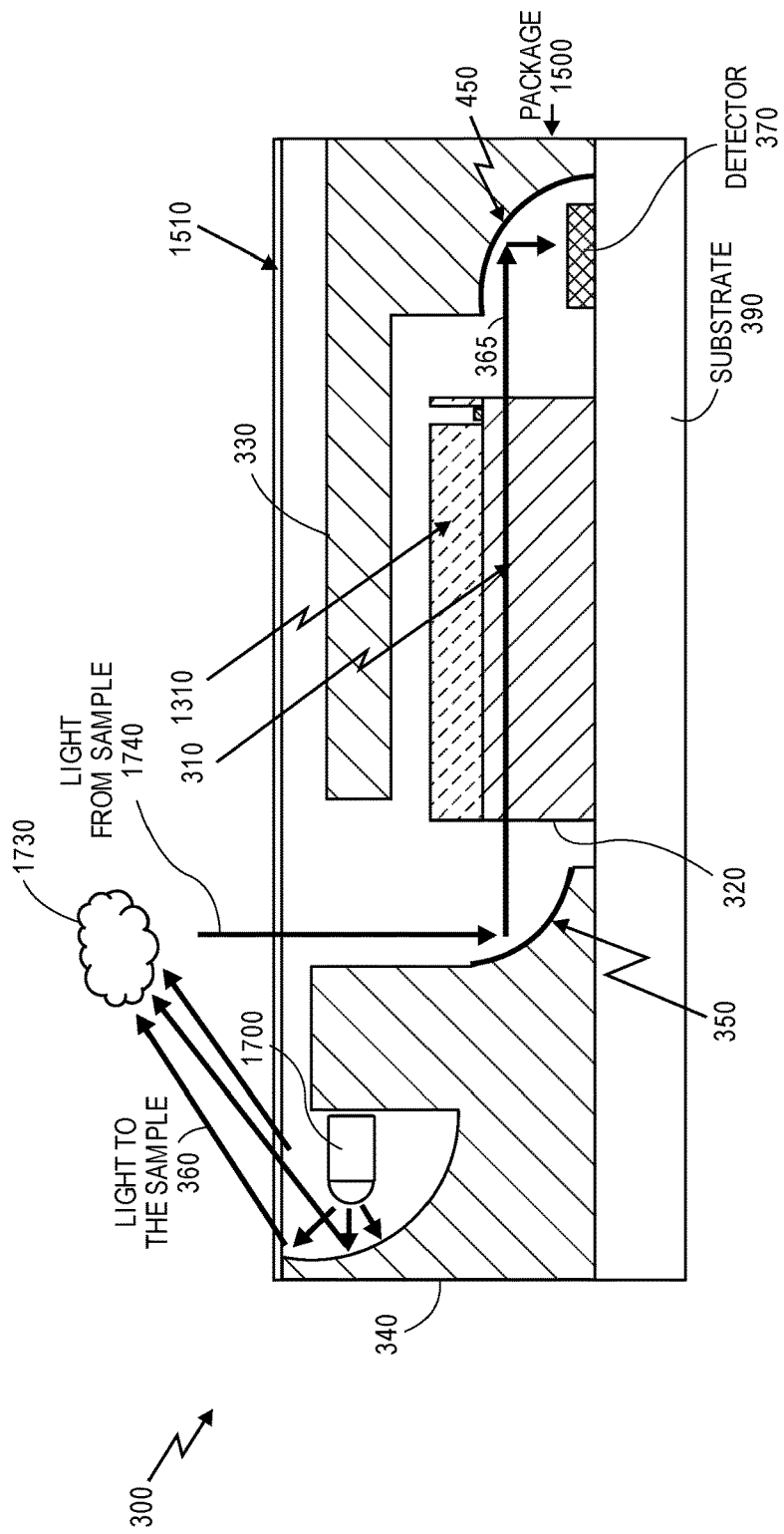
FIG. 18 is a diagram illustrating another example of a package including an integrated spectral unit, according to some aspects of the disclosure.

FIG. 18 illustrates another example of an integrated spectral unit 300 including a MEMS interferometer 310. In the example shown in FIG. 18, the light source 1700 is assembled on the light redirecting structure 330, which further includes an optical component (e.g., a reflector) 1800 for redirecting the input light beam 360 to the SUT to improve the coupling efficiency of the input light beam 360 to the SUT. In this example, the reflector 1800, as well as the first and second mirrors 350 and 450 are all monolithic and self-aligned, which reduces the cost of assembly and increases the production yield of the package 1500.

Figure 19:
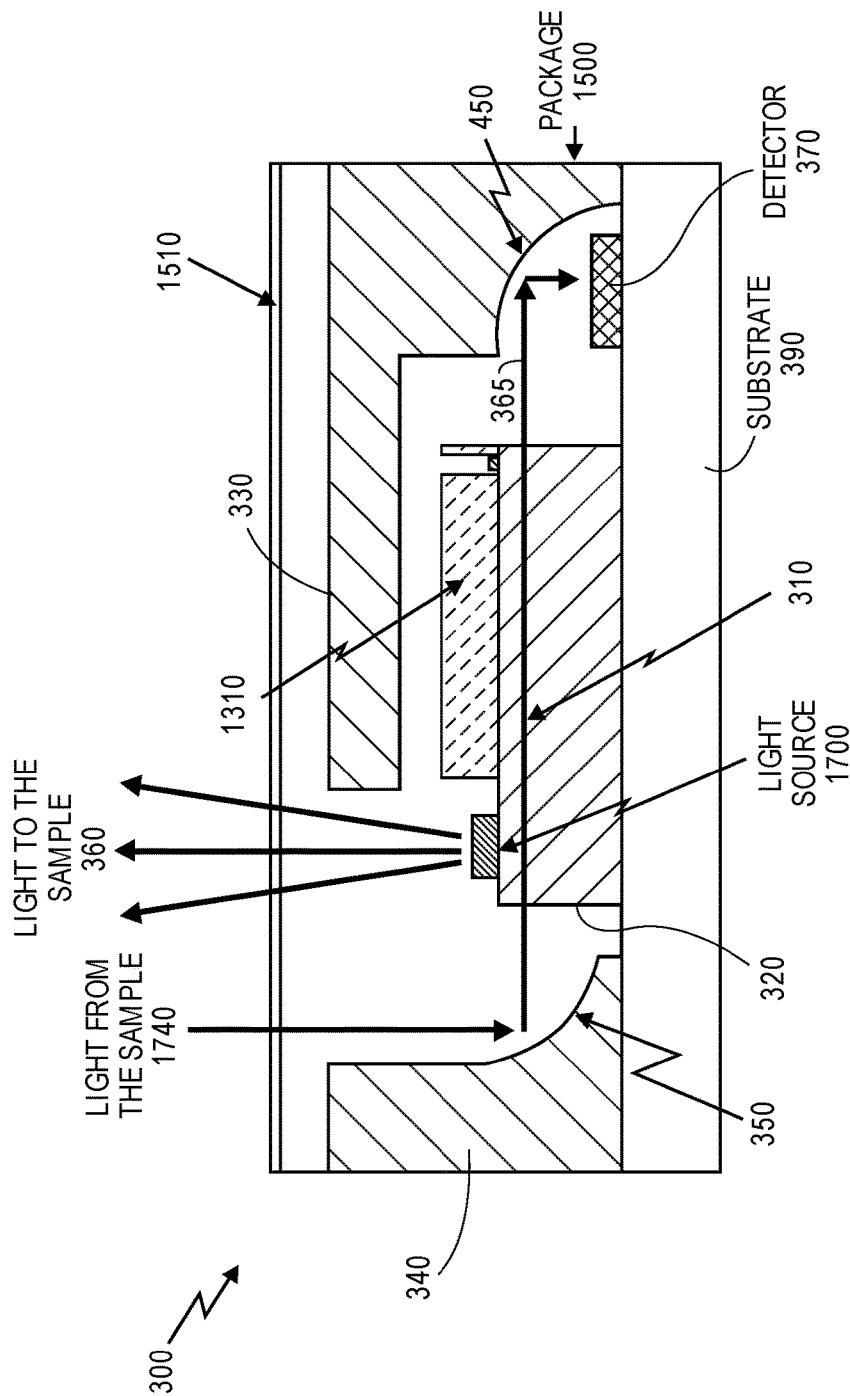
FIG. 19 is a diagram illustrating another example of a package including an integrated spectral unit, according to some aspects of the disclosure.

FIG. 19 illustrates another example of an integrated spectral unit 300 including a MEMS interferometer 310. In the example shown in FIG. 19, the light source 1700 is a miniaturized device that is fabricated on the first substrate (e.g., MEMS substrate) 320 using micromachining technology. For example, the light source 1700 may be fabricated with a heating element (not shown) to heat the light source 1700 and induce black body radiation. In some examples, the light source 1700 is preferably formed of silicon, while the heating element is formed of platinum. Furthermore, the light source 1700 may be in the form of nano- or microstructured silicon that improved the emissivity or radiation and the overall electrical-to-optical energy conversion efficiency. In some examples, instead of fabricating the light source 1700 on the first substrate 320, the light source 1700 may be fabricated on an additional substrate and integrated within the package 1500.

Figure 20:
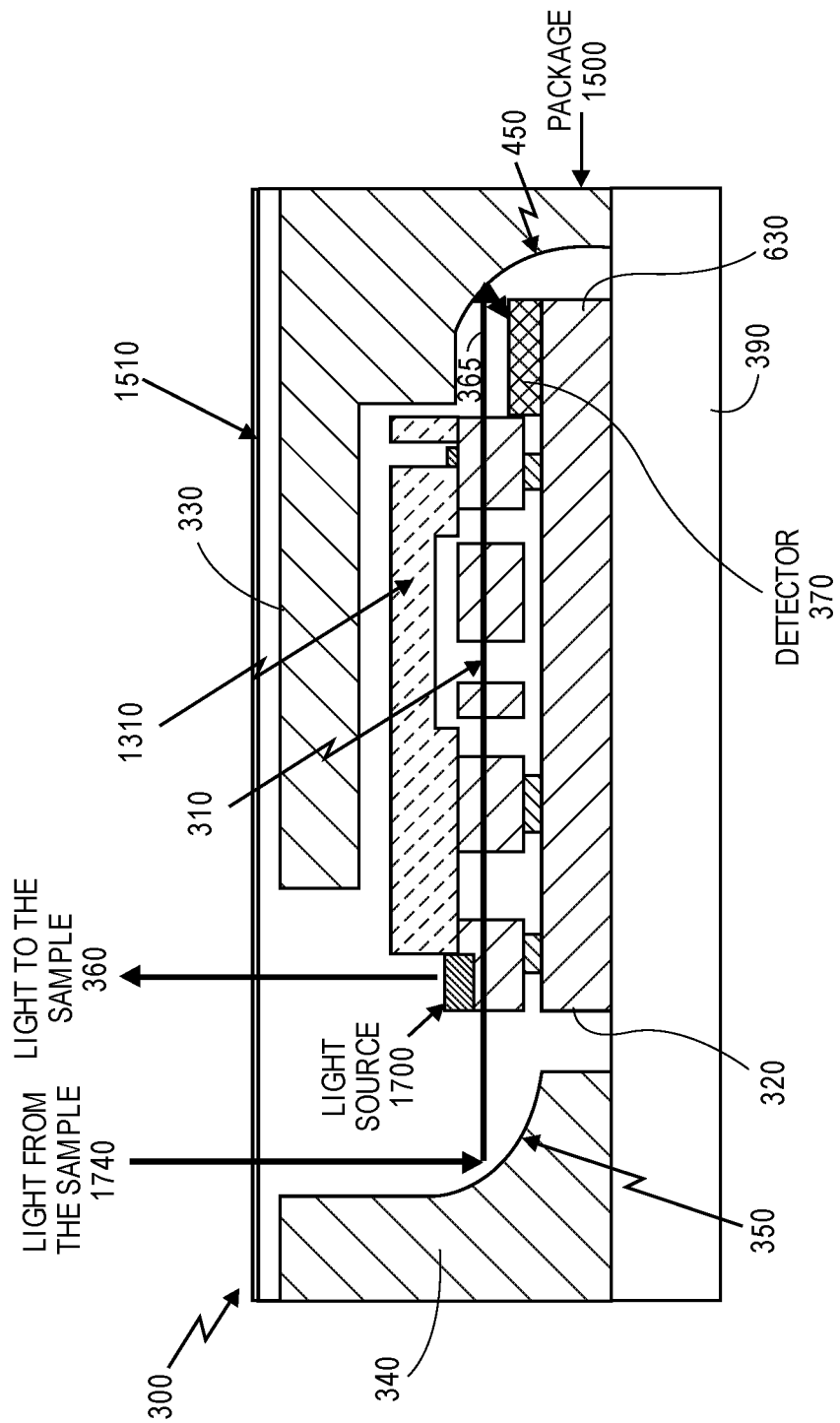
FIG. 20 is a diagram illustrating another example of a package including an integrated spectral unit, according to some aspects of the disclosure.

FIG. 20 illustrates another example of an integrated spectral unit 300 including a MEMS interferometer 310. In the example shown in FIG. 20, both the light source 1700 and the detector 370 are fabricated on the first substrate (e.g., MEMS substrate) 320. For example, the detector 370 may be assembled on the handle layer 630 of the first substrate 320. In some examples, the detector 370 may also be monolithically integrated by fabricating the detector in the handle layer 630, e.g., based on nano- or micro-structured silicon that improves the absorption in the infrared (IR) range. The sensing mechanism may be based on measuring the resistance of the photoconductive detector 370, the temperature change of the detector 370 due to absorption, or the electrical current change of the detector 370.

Figure 21:
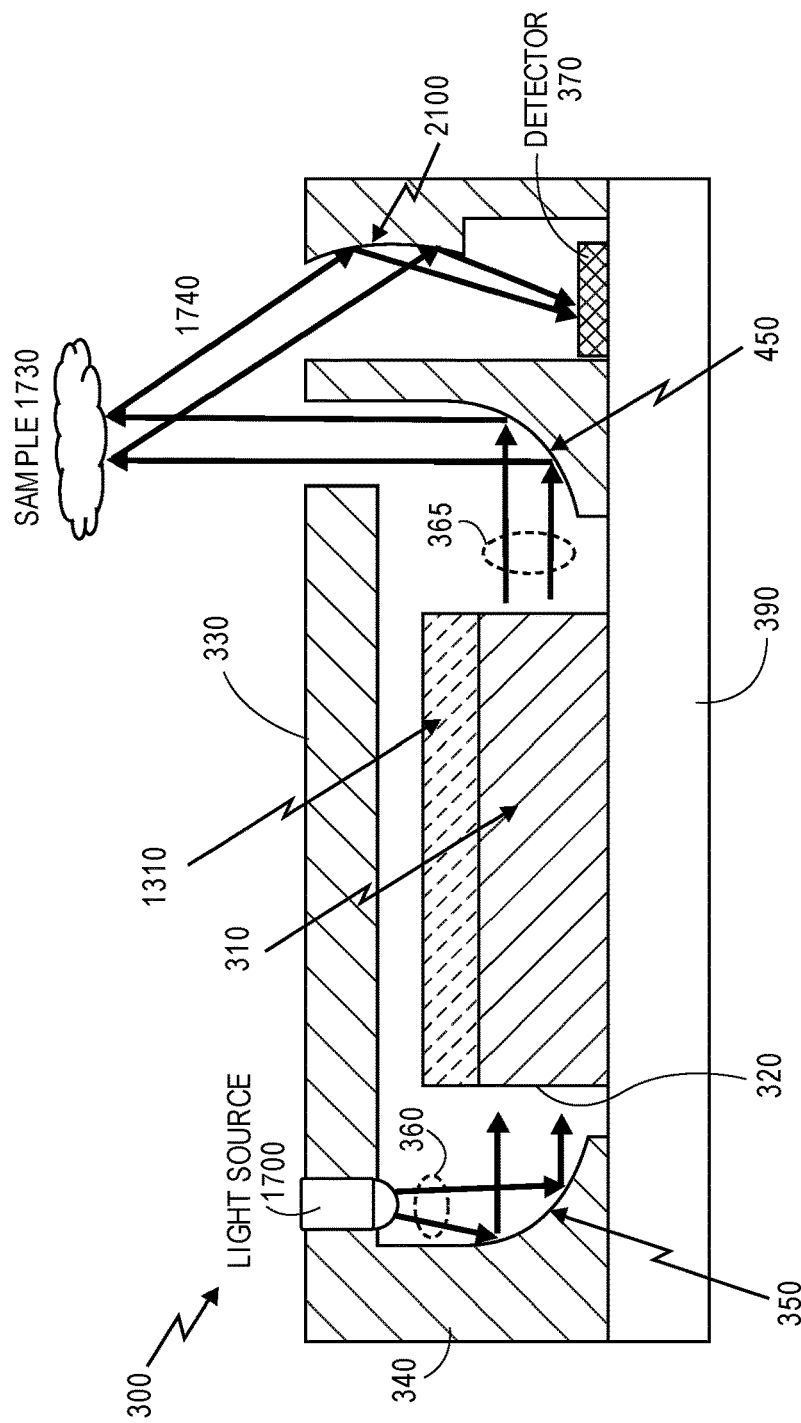
FIG. 21 is a diagram illustrating another example of a package including an integrated spectral unit, according to some aspects of the disclosure.

FIG. 21 illustrates another example of an integrated spectral unit 300 including a MEMS interferometer 310. In the example shown in FIG. 21, the light source 1700 is integrated on the light redirecting structure 330 and oriented to emit the input light beam 360 directly towards the first mirror 350. The output light beam 365 from the MEMS interferometer 310 is redirected by the second mirror 450 to the SUT 1730. The light 1740 transmitted and/or reflected from the SUT 1730 may then be optically coupled to the detector 370. In some examples, the light redirecting structure 330 may include an additional mirror 2100 to redirect the light 1740 from the SUT 1730 to the detector 370. In addition, the first substrate 320 (e.g., MEMS chip) may include one or more waveguides (not shown) to guide the input light beam 360 injected from the light source 1700 into the MEMS interferometer 310 or to guide the output light beam 365 from the MEMS interferometer 310 towards the second mirror 450.

Figure 22:
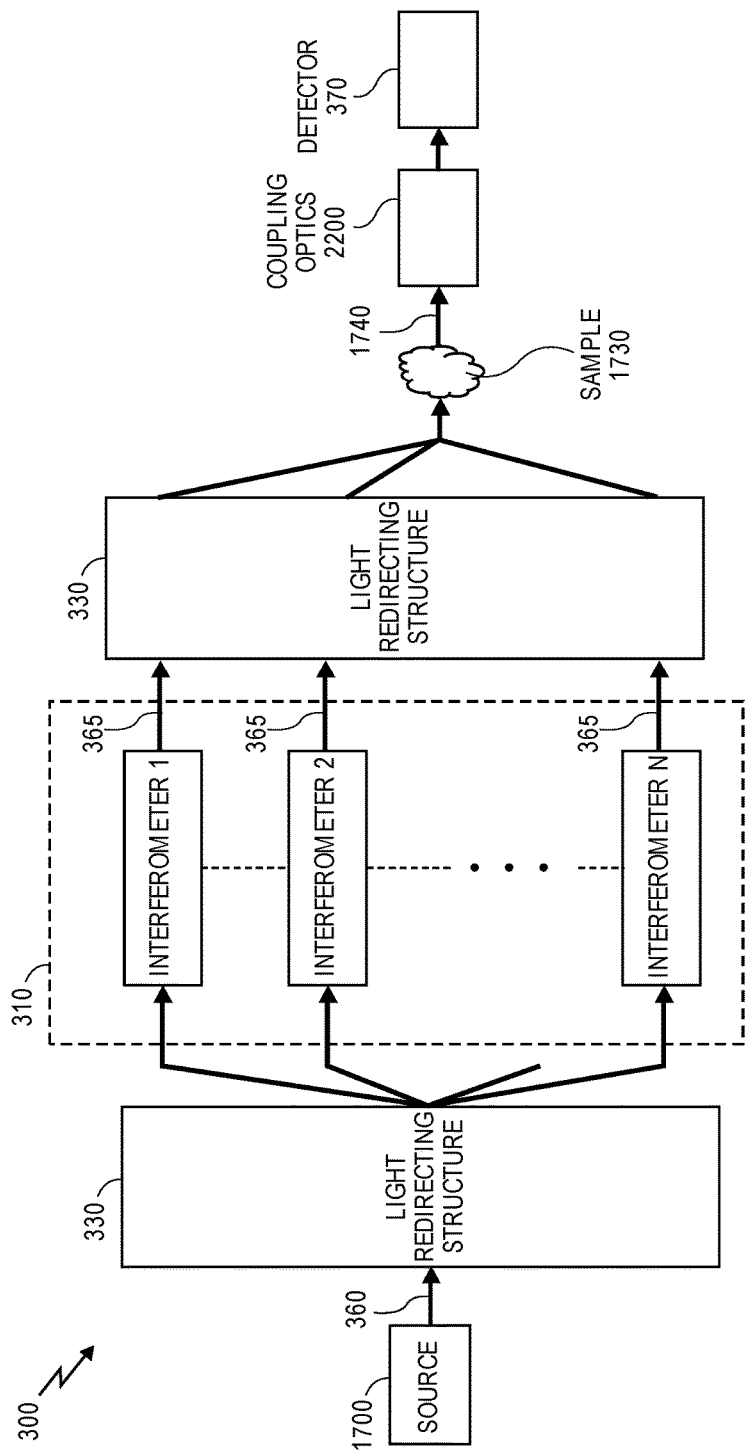
FIG. 22 is a schematic representation of an integrated spectral unit including a plurality of MEMS interferometers, according to some aspects of the disclosure.

FIG. 22 is a schematic representation of an integrated spectral unit 300 including a light source 1700, a MEMS interferometer 310, a light redirecting structure 330, and a detector 370. As shown in FIG. 22, the MEMS interferometer 310 includes a plurality of interferometers (Interferometer 1, Interferometer 2, . . . Interferometer N) working in parallel. The plurality of interferometers may be monolithically integrated in the same MEMS chip or in separate MEMS chips. The light redirecting structure 330 may include an optical splitter and a plurality of first mirrors working in parallel to couple the input light beam 360 from the light source 1700 to each of the plurality of interferometers. In addition, the light redirecting structure may include a plurality of second mirrors working in parallel to couple the respective output light beams from each of the plurality of interferometers to the SUT 1730 (e.g., via an optical combiner). The light 1740 transmitted and/or reflected from the SUT 1730 may be provided to the detector 370 via coupling optics 2200, which may be included within the light redirecting structure 330 or may be a separate structure. In some examples, the SUT may be positioned before the MEMS interferometer 310 in the light path instead of after the MEMS interferometer 310 and before the detector 370, as shown in FIG. 22.

Figure 23:
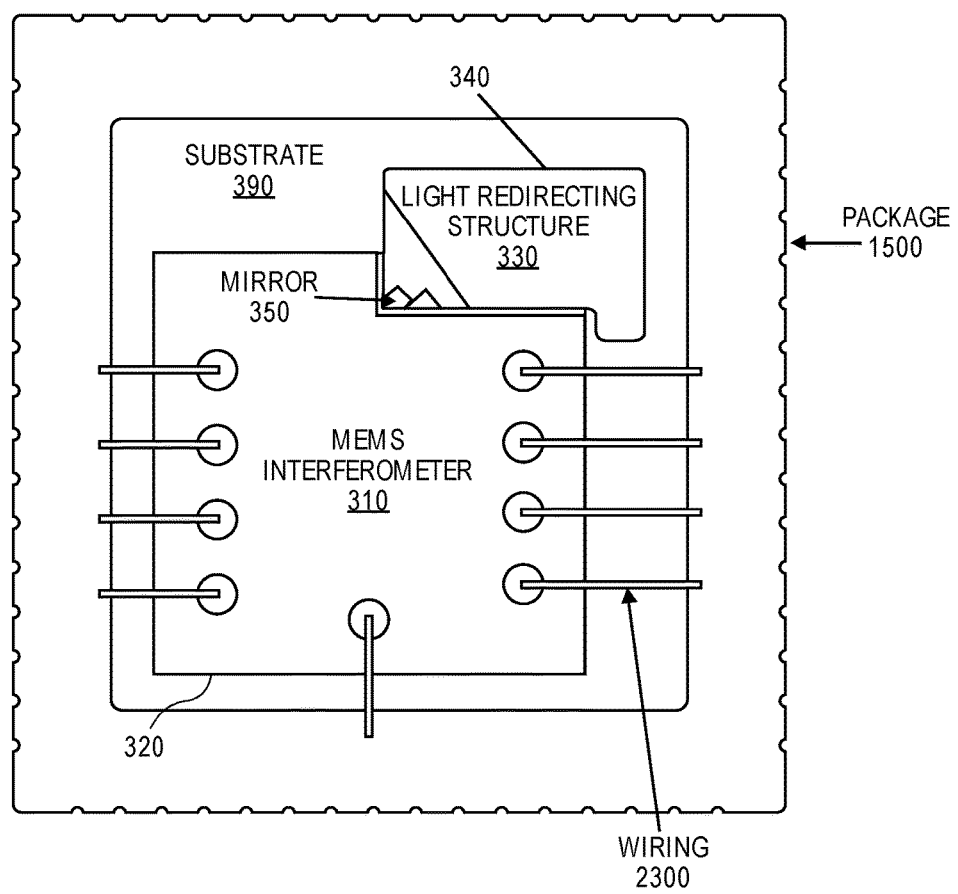
FIG. 23 is a top view of an example of a package including an integrated spectral unit, according to some aspects of the disclosure.

FIG. 23 is a top view of a package 1500 including an integrated spectral unit 330. The package 1500 includes the package substrate 390 on which the first substrate 320 including the MEMS interferometer 310 and the second substrate 340 including the light redirecting structure 330 are assembled. The light redirecting structure 330 may include at least the first mirror 350 to redirect the input light beam towards the MEMS interferometer 310. The detector (not shown) may be assembled or integrated on the first substrate 320, the second substrate 340, or the package substrate 390. The package 1500 may further include wiring 2300 for providing electrical connectivity to the MEMS interferometer 310 and detector.

Figure 24:
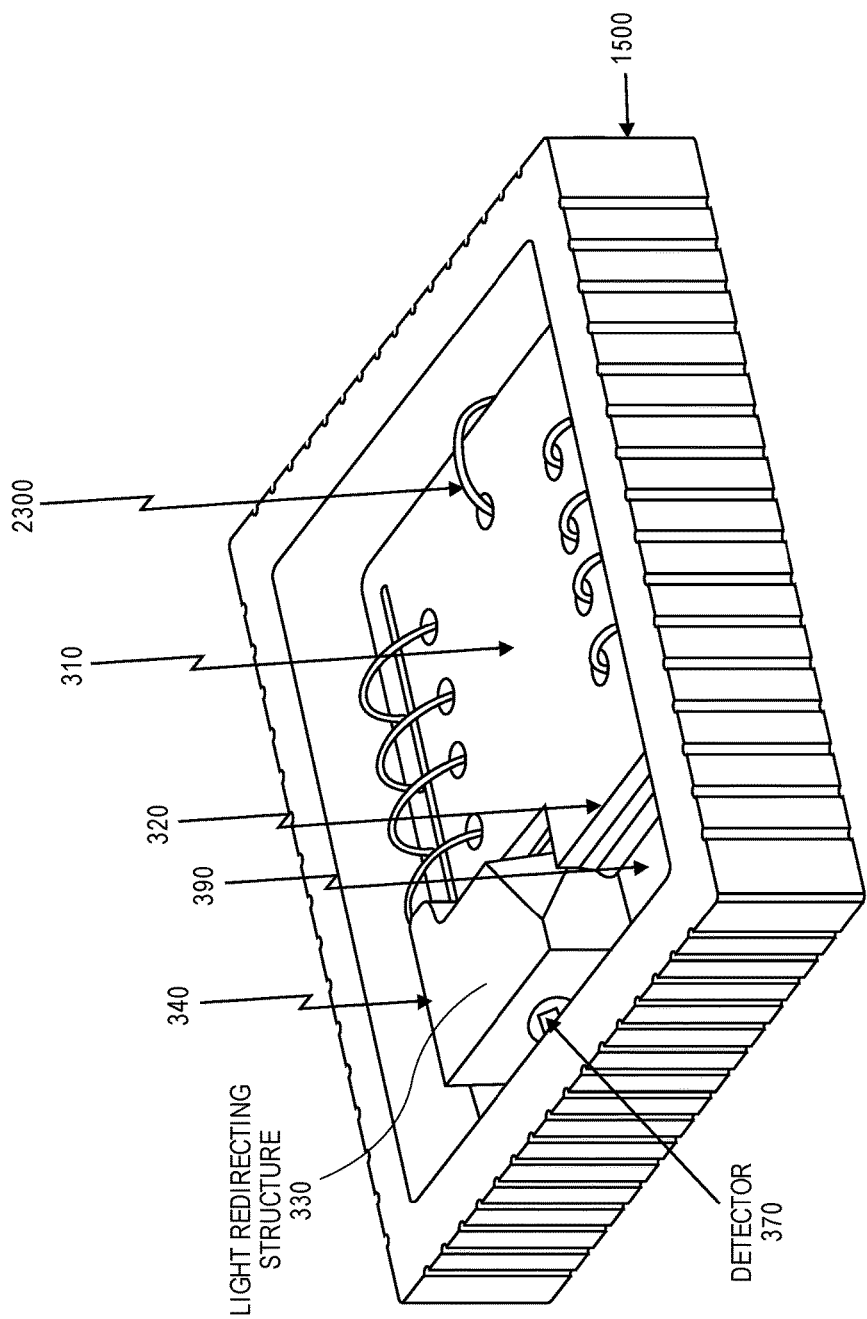
FIG. 24 is a perspective view of an example of a package including an integrated spectral unit, according to some aspects of the disclosure.

FIG. 24 is a perspective view of the package 1500 shown in FIG. 23. In FIG. 24, the detector 370 is shown assembled on a bottom surface of the light redirecting structure 330. Thus, the output light beam from the MEMS interferometer 310 may be redirected to the detector 370 via one or more mirrors (not specifically shown) within the light redirecting structure 330.

Figure 25:
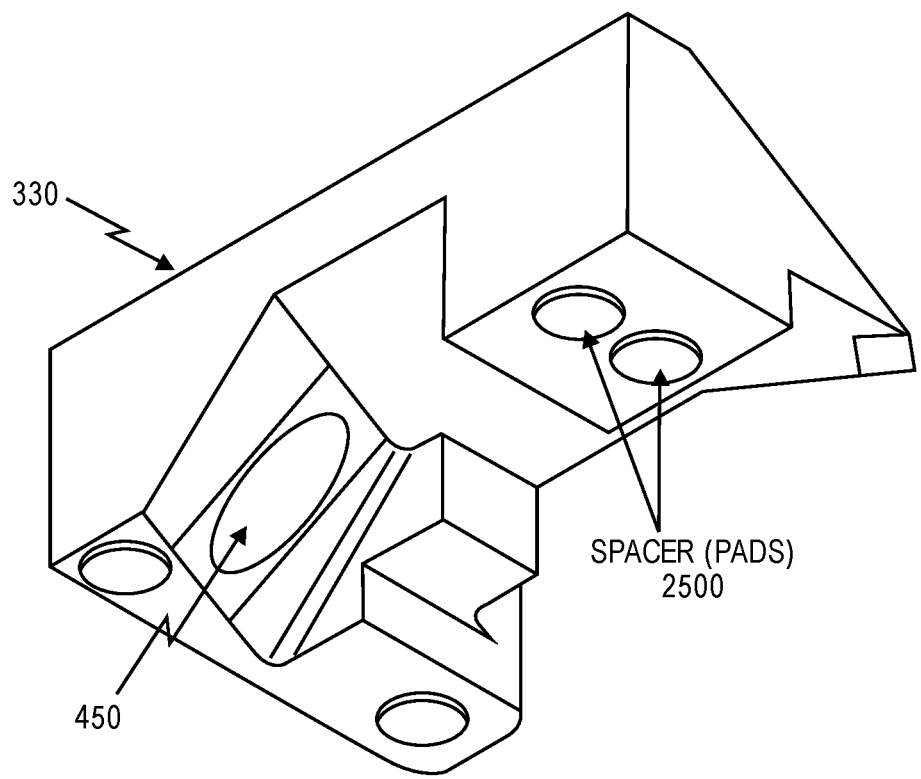
FIG. 25 is a perspective view of an example of a light redirecting structure, according to some aspects of the disclosure.

FIG. 25 is a perspective view of the light redirecting structure 330 shown in FIG. 24. In the perspective view, the second mirror 450 for redirecting the output light beam towards the detector is visible. However, it should be understood that the light redirecting structure 330 may further include the first mirror (not visible in the perspective view shown in FIG. 25) for redirecting the input light beam to the MEMS interferometer.

The light redirecting structure 330 may further include spacers or pads 2500 to facilitate assembly of the light redirecting structure 330 on the package substrate by epoxy bonding. In some examples, at least three spacers or pads 2500 are utilized to define the light redirecting structure base plane (referred to hereafter as base plane) with respect to the package substrate plane. In addition, the spacers or pads 2500 may have the same length or different lengths. For example, an angle may be introduced between the base plane and the package substrate plane by using spacers 2500 of different length. By contrast, equal length spacers 2500 may provide alignment between the base plane and the package substrate plane. However, the number of spacers 2500, the size of the spacers 2500, and the shape of the spacers 2500, along with the thickness of an epoxy layer (not shown) needed to fix the light redirecting structure 330 to the package substrate may be considered design optimization parameters. In some examples, the spacers 2500 may be monolithically fabricated in the light redirecting structure 330.

Figure 26:
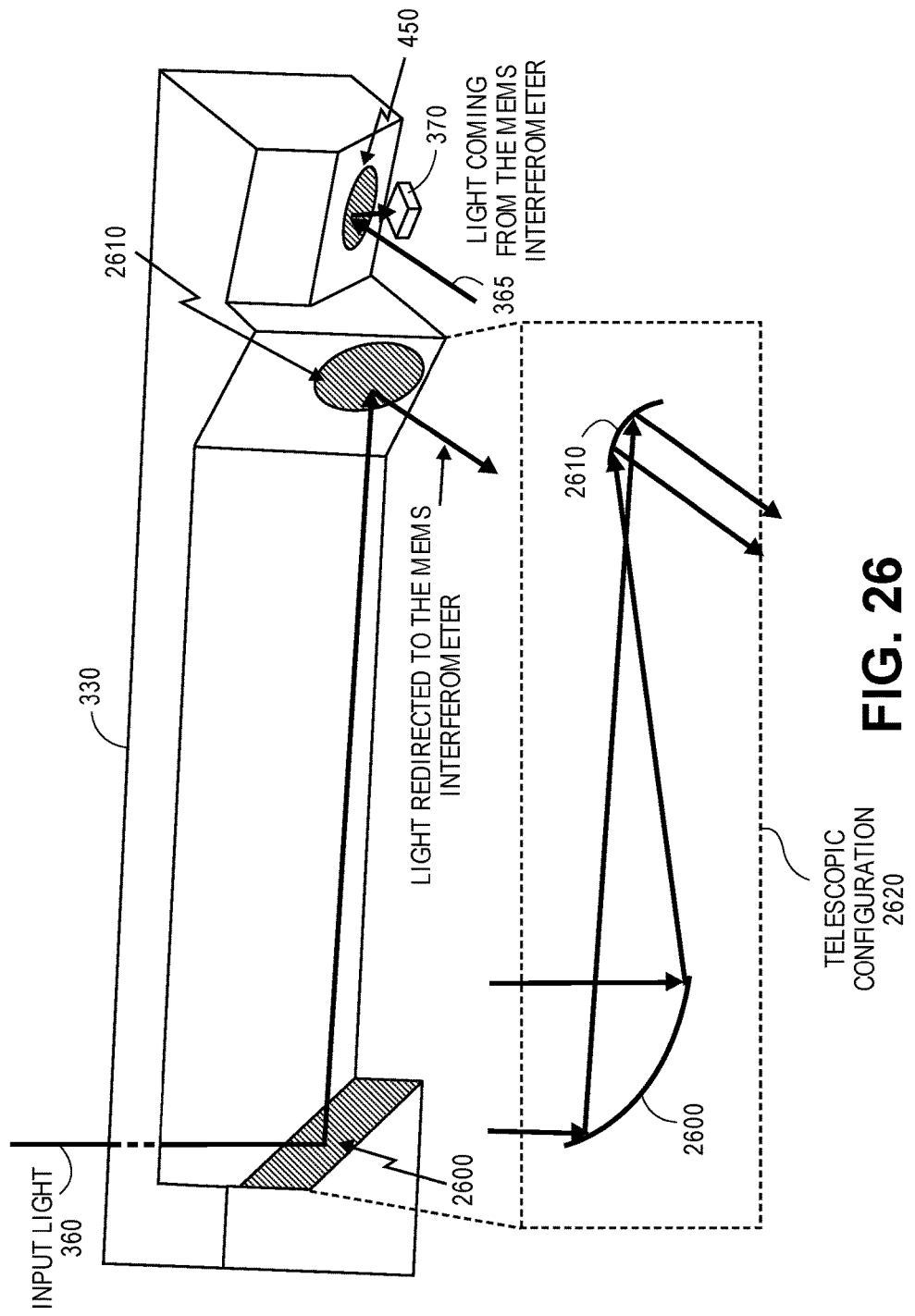
FIG. 26 is a perspective view of another example of a light redirecting structure, according to some aspects of the disclosure.

FIG. 26 is a perspective view of another light redirecting structure 330. In the light redirecting structure 330 shown in FIG. 26, the first mirror includes two input mirrors 2600 and 2610 optically coupled in a telescopic configuration 2620. Such a telescopic arrangement 2620 enables control of the acceptance spot size of the input light beam 360 to the MEMS interferometer, while maintaining a small acceptance angle, thus providing a nearly collimated input light beam 360. This may improve the visibility of interference and allows measuring a larger spot size, which may be needed to improve the spectral analysis sensitivity to any non-uniformity in the measured sample under test (SUT). In addition, in the light redirecting structure 330 shown in FIG. 26, the second mirror (output mirror) includes a single mirror to focus the output light beam 365 onto the detector 370.

Figure 27:
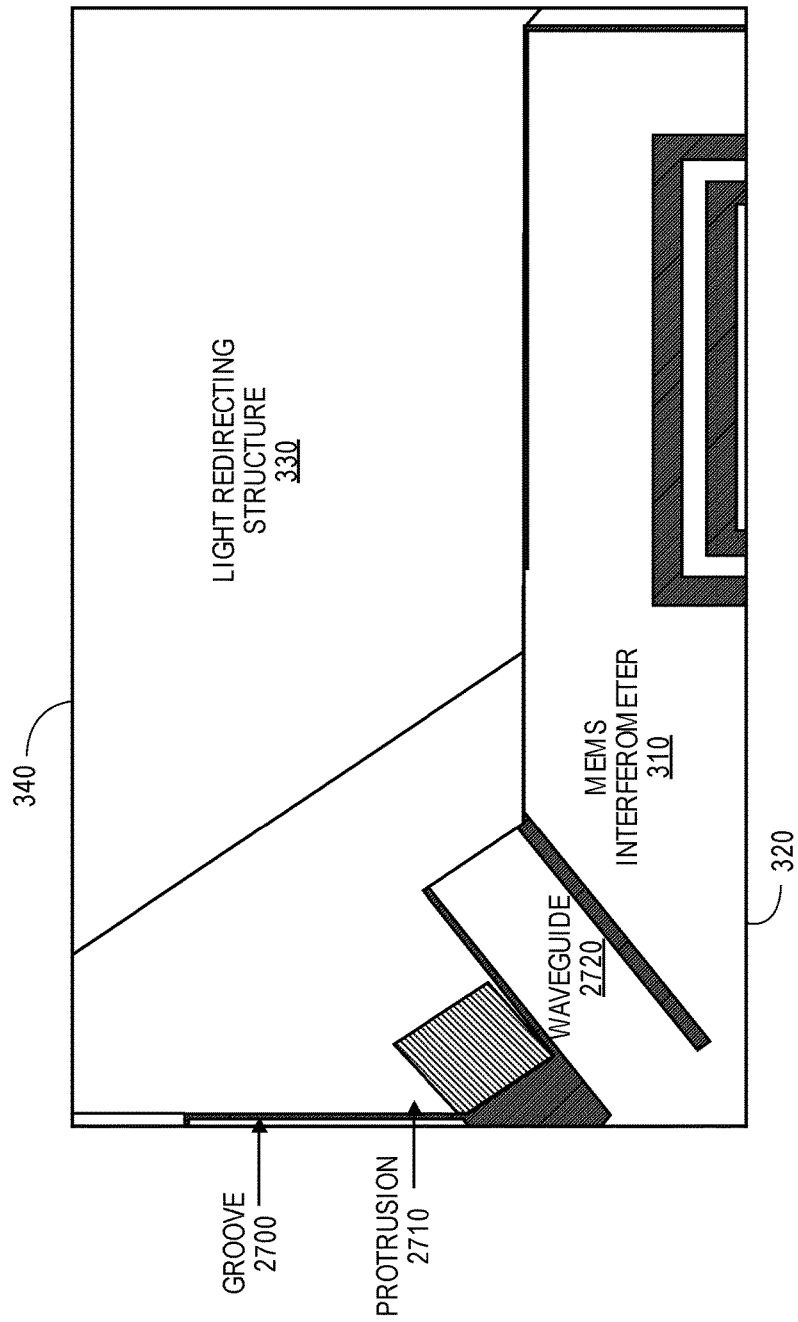
FIG. 27 is a diagram illustrating a passive alignment configuration of the MEMS interferometer and the light redirecting structure, according to some aspects of the disclosure.

FIG. 27 illustrates a passive alignment configuration of the first substrate 320 including the MEMS interferometer 310 and the second substrate 340 including the light redirecting structure 330. As shown in FIG. 27, the first substrate 320 includes one or more grooves 2700 and the second substrate 340 includes one or more protrusions 2710 that fit into corresponding ones of the grooves 2700 such that integration of the MEMS interferometer 310 and light redirection structure 330 is carried out in a passive alignment manner. The groove(s) 2700 may have various shapes, each compatible with mating with respective protrusions 2710 in the light redirecting structure 330. In other examples, the protrusions 2710 may be defined in the first substrate 320 (e.g., MEMS substrate), while the grooves 2700 are defined in the second substrate 340 (e.g., light redirecting structure substrate). As further illustrated in FIG. 27, the first substrate 320 may further include one or more waveguides 2720 for guiding the input/output light beam to/from the MEMS interferometer 310. By fabricating the waveguide(s) 2720 within the same substrate (e.g., first substrate 320) as the MEMS interferometer 310, the waveguide(s) may be self-aligned and a monolithic part of the MEMS chip. In other examples, one or more waveguides may be assembled onto the MEMS chip (e.g., first substrate 320) or on a separate chip. In this example, the waveguide(s) may be optical fibers.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-27 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-27 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. An integrated spectral unit, comprising:
    a first substrate;
    a second substrate coupled to the first substrate;
    a micro-electro-mechanical systems (MEMS) interferometer fabricated within the first substrate, the MEMS interferometer optically coupled to receive an input light beam and to direct the input light beam along an optical path to produce an output light beam resulting from interference experienced by the input light beam along the optical path; and
    a light redirecting structure integrated on the second substrate, the light redirecting structure comprising a first mirror configured to receive the input light beam propagating in an out-of-plane direction with respect to the first substrate and to redirect the input light beam to an in-plane direction with respect to the first substrate towards the MEMS interferometer.

2. The integrated spectral unit of claim 1, further comprising:
    a detector optically coupled to receive the output light beam from the MEMS interferometer and to produce an interferogram from the output light beam.

3. The integrated spectral unit of claim 2, wherein the light redirecting structure further comprises a second mirror optically coupled to receive the output light beam propagating in the in-plane direction with respect to the first substrate from the MEMS interferometer and to redirect the output light beam to the detector.

4. The integrated spectral unit of claim 3, wherein the detector is oriented in the in-plane direction with respect to the first substrate to receive the output light beam propagating in the out-of-plane direction with respect to the first substrate from the second mirror.

5. The integrated spectral unit of claim 4, wherein the detector is assembled on the second substrate.

6. The integrated spectral unit of claim 5, wherein:
    the second substrate comprises a capping layer extending over the first substrate comprising the MEMS interferometer to hermetically seal the MEMS interferometer; and
    the detector is assembled on the capping layer.

7. The integrated spectral unit of claim 6, wherein:
    the detector is assembled on an exterior surface of the capping layer; and
    the second mirror is configured to reflect the output light beam through the capping layer towards the detector.

8. The integrated spectral unit of claim 6, wherein:
    the detector is assembled on an interior surface of the capping layer; and
    the capping layer comprises a through via configured to provide electrical connectivity to the detector.

9. The integrated spectral unit of claim 4, wherein the detector is assembled on the first substrate.

10. The integrated spectral unit of claim 9, wherein:
    the first substrate comprises a device layer, a handle layer, and a buried oxide layer between the device layer and the handle layer;
    the MEMS interferometer is fabricated within the device layer; and
    the detector is assembled on the handle layer on a same side of the first substrate as the MEMS interferometer.

11. The integrated spectral unit of claim 10, wherein the handle layer comprises a through via configured to provide electrical connectivity to the detector.

12. The integrated spectral unit of claim 4, further comprising:
    a third substrate on which the first substrate and the second substrate are assembled, wherein the detector is assembled on the third substrate.

13. The integrated spectral unit of claim 12, wherein the detector is positioned within a groove in the third substrate.

14. The integrated spectral unit of claim 12, wherein the detector is positioned on a surface of the third substrate within an opening of the first substrate.

15. The integrated spectral unit of claim 12, further comprising:
a package comprising the first substrate, the second substrate, and the third substrate, wherein the third substrate comprises a package substrate within the package.

16. The integrated spectral unit of claim 15, wherein:
the package further comprises a window that is transparent within a wavelength range of operation of the MEMS interferometer; and
the input light beam propagates through the window towards the first mirror of the light redirecting structure in the out-of-plane direction with respect to the first substrate.

17. The integrated spectral unit of claim 16, further comprising:
a light source within the package and configured to emit the input light beam.

18. The integrated spectral unit of claim 17, wherein:
the light source is assembled on the light redirecting structure; and
the light redirecting structure further comprises an optical component optically coupled to redirect the input light beam from the light source.

19. The integrated spectral unit of claim 17, wherein the light source is integrated on the first substrate.

20. The integrated spectral unit of claim 16, wherein the window further comprises a lens optically coupled to focus the input light beam on the first mirror of the light redirecting structure.

21. The integrated spectral unit of claim 16, further comprising:
a lid assembled on the window and comprising an aperture for directing the input light beam through the window towards the first mirror of the light redirecting structure.

22. The integrated spectral unit of claim 12, wherein the light redirecting structure comprises spacers or pads to facilitate assembly of the light redirecting structure together with the MEMS interferometer on the third substrate.

23. The integrated spectral unit of claim 3, wherein at least one of the first mirror and the second mirror comprises a curved surface.

24. The integrated spectral unit of claim 2, wherein the detector is oriented in the out-of-plane direction with respect to the first substrate and optically coupled to receive the output light beam propagating in the in-plane direction with respect to the first substrate from the MEMS interferometer.

25. The integrated spectral unit of claim 2, wherein the light redirecting structure further comprises a second mirror optically coupled to receive the output light beam and to direct the output light beam towards a sample under test prior to the detector.

26. The integrated spectral unit of claim 1, wherein the first mirror comprises a first input mirror and a second input mirror optically coupled in a telescopic configuration.

27. The integrated spectral unit of claim 1, wherein the first mirror comprises a total internal reflection mirror within the light redirecting structure.

28. The integrated spectral unit of claim 1, wherein:
the MEMS interferometer comprises one or more grooves; and
the light redirecting structure comprises one or more protrusions that each fit into a corresponding one of the one or more grooves.

29. The integrated spectral unit of claim 28, wherein at least one of the one or more protrusions comprises a waveguide for directing the input light beam towards the MEMS interferometer or the output light beam from the MEMS interferometer.

30. The integrated spectral unit of claim 1, wherein the second substrate comprising the light redirecting structure comprises a precision molded component.

31. The integrated spectral unit of claim 30, wherein the precision molded component comprises a plastic molded component or a glass molded component.

32. The integrated spectral unit of claim 1, wherein the light redirecting structure further comprises an aperture through which the input light beam passes towards the first mirror.

33. The integrated spectral unit of claim 1, further comprising:
a capping layer extending over the light redirecting structure;
wherein the second substrate and the capping layer are bonded to the first substrate; and
wherein the input light beam passes through the capping layer and the light redirecting structure towards the first mirror.

34. The integrated spectral unit of claim 1, wherein the MEMS interferometer comprises a Michelson interferometer or cascaded Fabry-Perot interferometers.

35. The integrated spectral unit of claim 34, wherein:
the MEMS interferometer comprises at least one moveable mirror coupled to at least one actuator configured to displace the at least one moveable mirror to vary the optical path within the MEMS interferometer; and
the first substrate further comprises at least one through via configured to provide electrical connectivity to the at least one actuator.

36. The integrated spectral unit of claim 1, wherein:
the MEMS interferometer comprises a plurality of interferometers coupled in parallel; and
the first mirror comprises a plurality of first mirrors, each optically coupled to redirect the input light beam towards a corresponding one of the plurality of interferometers.

* * * * *